(12) United States Patent
Takita et al.

(10) Patent No.: US 7,944,587 B2
(45) Date of Patent: May 17, 2011

(54) IMAGE DATA GENERATION DEVICE, IMAGE DATA GENERATION PROCESSING PROGRAM AND THERMAL TRANSFER RECORDING DEVICE

(75) Inventors: Hiroaki Takita, Tokyo (JP); Takayuki Ohkubo, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 423 days.

(21) Appl. No.: 11/887,509

(22) PCT Filed: Mar. 24, 2006

(86) PCT No.: PCT/JP2006/305977
§ 371 (c)(1),
(2), (4) Date: Dec. 4, 2008

(87) PCT Pub. No.: WO2006/104041
PCT Pub. Date: Oct. 5, 2006

(65) Prior Publication Data
US 2009/0096827 A1    Apr. 16, 2009

(30) Foreign Application Priority Data

Mar. 29, 2005  (JP) ................ P2005-096406

(51) Int. Cl.
*H04N 1/40* (2006.01)
(52) U.S. Cl. .............. 358/3.01; 358/3.13; 358/3.16
(58) Field of Classification Search ............ 358/3.01, 358/3.06, 3.13, 3.16, 3.17
See application file for complete search history.

(56) References Cited

U.S. PATENT DOCUMENTS

| 5,099,259 A | 3/1992 | Hirahara et al. |
| 2006/0181739 A1* | 8/2006 | Yamakado ............ 358/3.13 |

FOREIGN PATENT DOCUMENTS

| EP | 0 580 151 A2 | 1/1994 |
| JP | 8-20125 | 1/1996 |
| JP | 9-1866 | 1/1997 |
| JP | 9-121283 | 5/1997 |
| JP | 9-326927 | 12/1997 |
| JP | 10-290367 | 10/1998 |
| JP | 11-69158 | 3/1999 |
| JP | 2002-44467 | 2/2002 |
| JP | 2003-51943 | 2/2003 |

OTHER PUBLICATIONS

European Search Report—Aug. 6, 2010.

* cited by examiner

*Primary Examiner* — Thomas D Lee
(74) *Attorney, Agent, or Firm* — Young & Thompson

(57) ABSTRACT

An image data generation device is provided with: an image data acquisition unit for acquiring image data; a division unit for spatially dividing the acquired data by a plurality of matrices; a priority order setting element for setting the priority order for performing gradation conversion of picture elements that make up the image data that corresponds to each of the matrices, and sets the priority order so that the priority order becomes lower going from picture elements located in the center of the matrix toward picture elements located on the outside edges of the matrix; a gradation conversion member for performing gradation conversion of the picture elements according to the priority order; and an image data generation unit for generating image data for printing based on a dot pattern that is formed by the picture elements after the gradation conversion.

16 Claims, 19 Drawing Sheets

FIG. 6A

PRIORITY ORDER MATRIX Mp

| 8 | 3 | 9 |
|---|---|---|
| 4 | 1 | 5 |
| 6 | 2 | 7 |

PRIORITY ORDER n

FIG. 6B

START-OF-GROWTH MATRIX Mth

| 213 | 71 | 241 |
|-----|----|----|
| 99 | 14 | 128 |
| 156 | 43 | 184 |

START-OF-GROWTH GRADATION VALUE $t_n$

FIG. 6C

INPUT IMAGE DATA 200dpi

| 99 |
|----|

FIG. 8
INPUT IMAGE DATA
200dpi
OUTPUT IMAGE DATA
600dpi
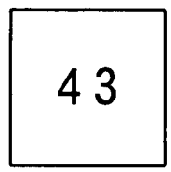 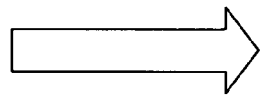 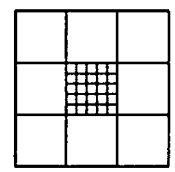
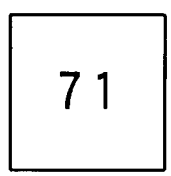 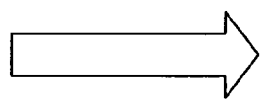 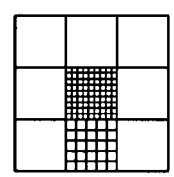
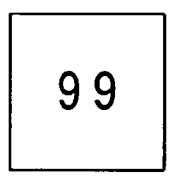 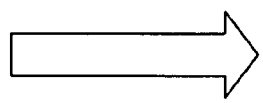 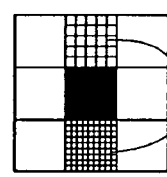
FRINGE PICTURE ELEMENT
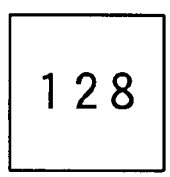 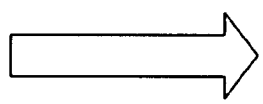 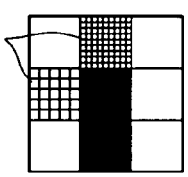
FRINGE PICTURE ELEMENT
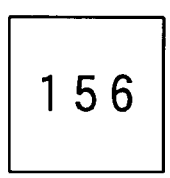 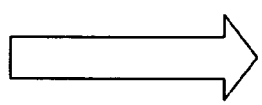 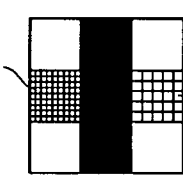
FRINGE PICTURE ELEMENT
FRINGE PICTURE ELEMENT
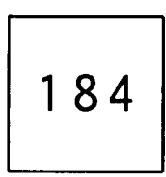 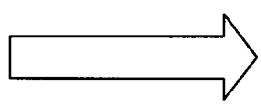 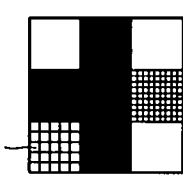
FRINGE PICTURE ELEMENT
FRINGE PICTURE ELEMENT
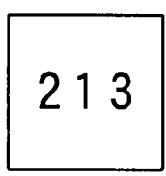 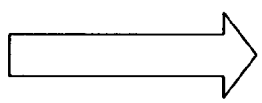 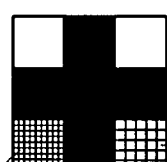
FRINGE PICTURE ELEMENT
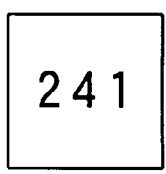 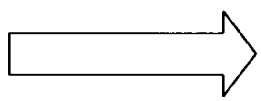 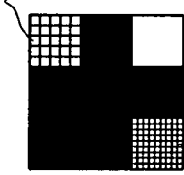
FRINGE PICTURE ELEMENT FIG.11 (5)
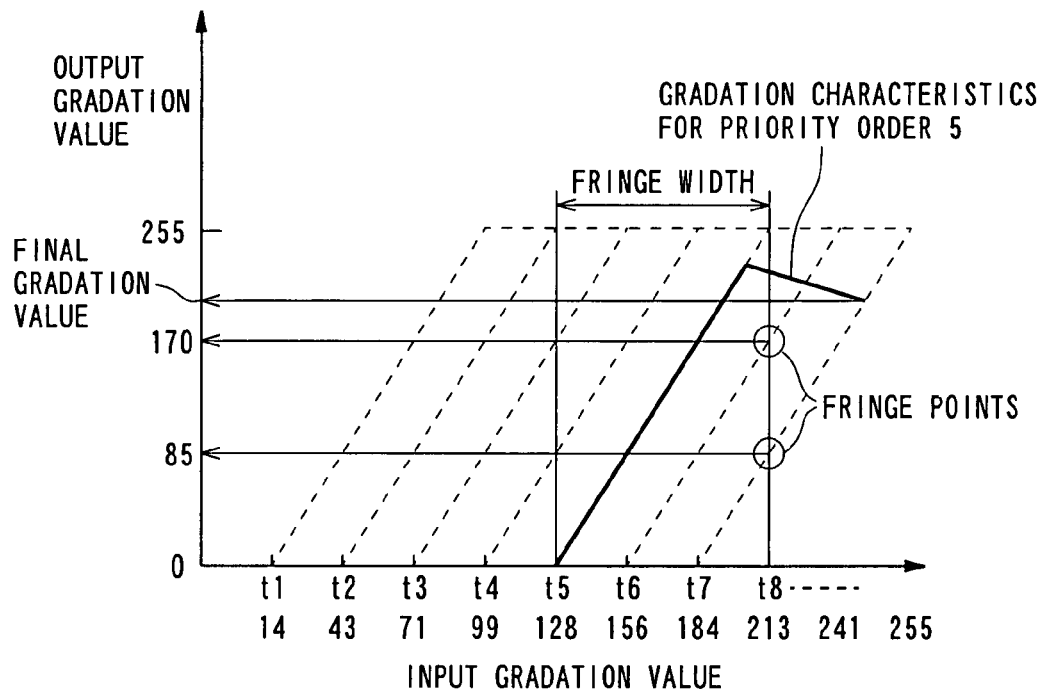
FIG.11 (6)
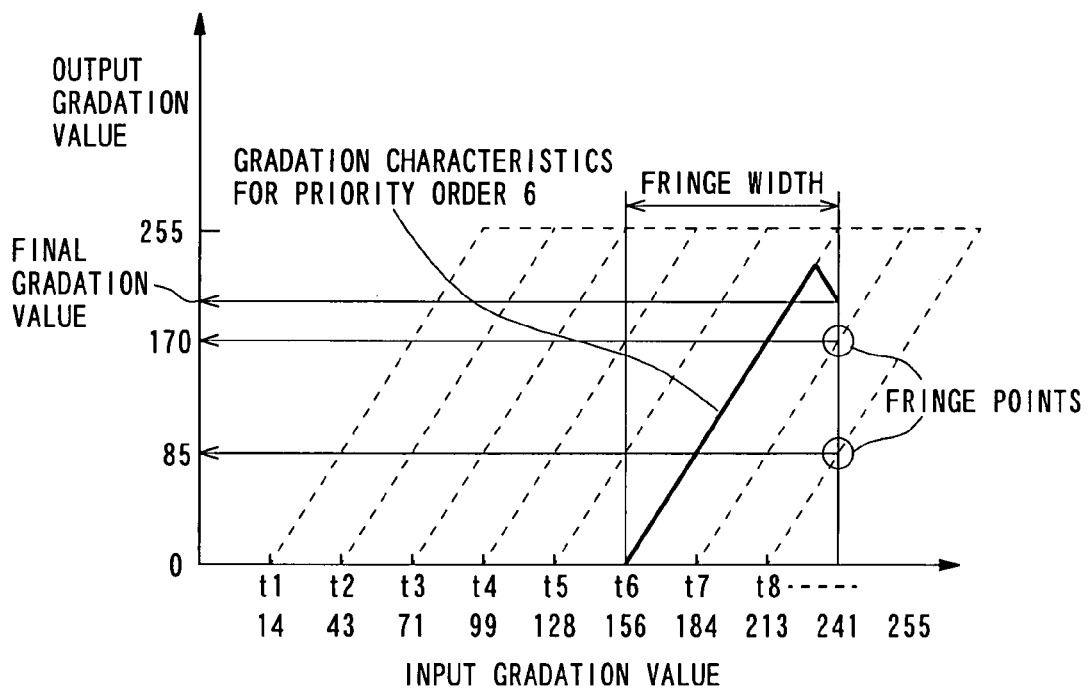

FIG.15
OUTPUT IMAGE DATA 600dpi
TRANSFER RESULT
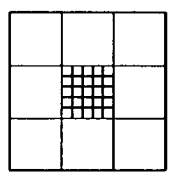 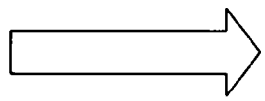 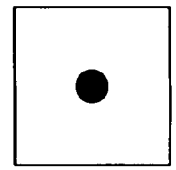
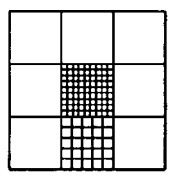 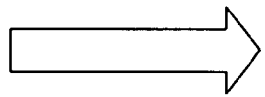 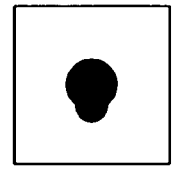
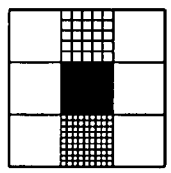 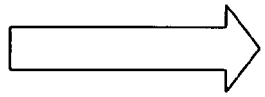 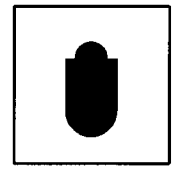
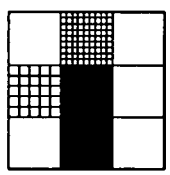 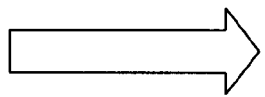 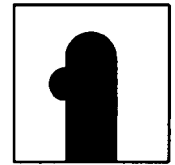
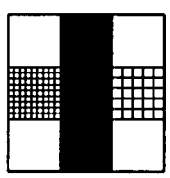 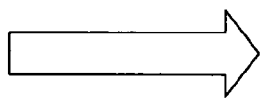 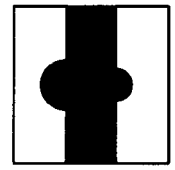
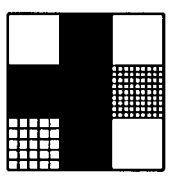 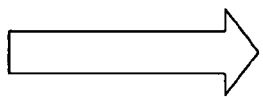 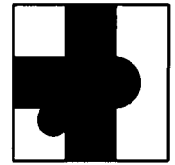
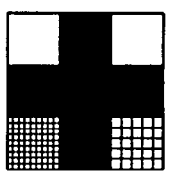  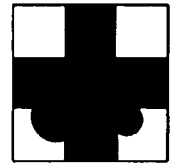
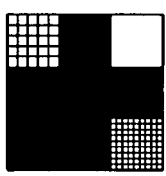 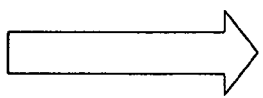 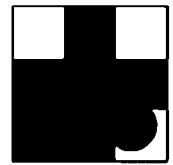

IMAGE DATA GENERATION DEVICE,
IMAGE DATA GENERATION PROCESSING
PROGRAM AND THERMAL TRANSFER
RECORDING DEVICE

TECHNICAL FIELD

This invention relates to a thermal transfer recording device, and more particularly to a technique of improving the gradation in thermal transfer recording.

BACKGROUND ART

In transfer by a conventional fusion type thermal transfer printer, thermal heads, which are the heating elements, are aligned in one dimension (main scanning direction), and recording sheets or film are fed sequentially in the printing direction (sub scanning direction) over the thermal heads.

The heating amount of the thermal heads can be control led in steps, however, when melting and transferring color material, the thermal heads are easily affected by the dot density or adjacent dots, and it becomes difficult to control the gradation for each picture element, so control is performed using the two values: to melt and transfer/not to transfer. In this case, by drawing dots having a set size, gradation is expressed by area modulation. For example, a halftone generation method, which uses a rational tangent matrix, or a supercell type halftone generation method, which is based on this method and performs a pseudo increase of the number of gradations using a plurality of matrices, are used.

In addition to these methods, a method has been proposed in which the heating amount is changed according to the spatial arrangement of picture elements; for example, in Japanese patent application H8-20125, a technique is disclosed in which the dot area to be transferred as dots is controlled by the heating value of the heating elements, and in Japanese patent application H9-1866, a technique is disclosed in which a gradation conversion table is switched according to even lines and odd lines.

DISCLOSURE OF THE INVENTION

Problems to be Solved by the Invention

However, in recent years, as the resolution of thermal heads has improved (for example, from 300 dpi to 600 dpi), there is a problem in that contrary to this, the effect of accumulated heat increases and gradation control becomes more difficult as the image resolution increases. For example, depending on the transferability of the thermal heads and the fusion type thermal transfer film, the stability of the dots decreases at or near the critical heat where the ink ribbon may melt and adhere to the transfer film, or the area of the dots may increase due to the effect of accumulated heat in the heads, such as when the heat applied to the previous picture element is large, or the ink ribbon may stick to the film or wrinkling may occur. Also, there is a problem in that when expressing gradation, tone jumps may occur when the gradation is poor.

Taking the above problems into consideration, the object of the present invention is to provide an image generation device, image data creation processing program and thermal transfer recording device that has excellent gradation with a dot pattern having good stability.

Means for Solving the Problems

The present invention recited in Claim 1 for solving the above-mentioned problems is directed to an image data generation device is provided with: an image data acquisition means for acquiring image data; a division means for spatially dividing the acquired data by a plurality of matrices; a priority order setting means for setting the priority order for performing gradation conversion of picture elements that make up the image data that corresponds to each of the matrices, and sets the priority order so that the priority order becomes lower going from picture elements located in the center of the matrix toward picture elements that are located on the outside edges of the matrix; a gradation conversion means for performing gradation conversion of the picture elements according to the priority order; and an image data generation means for generating image data for printing based on a dot pattern that is formed by the picture elements after the gradation conversion.

The present invention recited in Claim 2 for solving the above-mentioned problems is directed to the image data generation device of claim 1, wherein the gradation conversion means performs gradation conversion of the picture elements according to a gradation number of 3 or more, and performs the gradation conversion on adjacent picture elements that are adjacent to core picture elements that have that maximum gradation values among all of the picture elements after the gradation conversion so that the gradation values of the adjacent picture elements become an intermediate gradation value.

The present invention recited in Claim 3 for solving the above-mentioned problems is directed to the image data generation device of claim 2, wherein the gradation conversion means performs the gradation conversion on adjacent picture elements that are adjacent to the adjacent picture elements so that their gradation value becomes an intermediate gradation value.

The present invention recited in Claim 4 for solving the above-mentioned problems is directed to the image data generation device of any one of the claims 1 to 3, wherein the gradation conversion means performs a gradation value correction of the picture elements after the gradation conversion so that the gradation values become smaller.

The present invention recited in Claim 5 for solving the above-mentioned problems is directed to the image data generation device of claim 2 or claim 3, wherein the gradation conversion means performs a gradation value correction on only the core picture elements so that their gradation values become smaller.

The present invention recited in Claim 6 for solving the above-mentioned problems is directed to the image data generation device of claim 4 or claim 5, wherein the gradation conversion means performs the gradation value correction so that the gradation values of the picture elements are equal to or greater than the critical amount of heat at which the dot pattern is stable, and equal to or less than the limit amount of heat at which transfer during printing is stable.

The present invention recited in Claim 7 for solving the above-mentioned problems is directed to a thermal transfer recording means is provided with: the image data generation device of any one of the claims 1 to 6; and a printing means for printing the image data generated by the data image generation device on to a sheet by a thermal head.

The present invention recited in Claim 8 for solving the above-mentioned problems is directed to the thermal transfer recording device of claim 6, wherein the printing means performs printing according to a fusion type thermal transfer method that uses fusion type thermal transfer film.

The present invention recited in Claim 9 for solving the above-mentioned problems is directed to an image data generation processing program that makes a computer function as: an image data acquisition means for acquiring image data; a division means for spatially dividing the acquired data by a plurality of matrices; a priority order setting means for setting the priority order for performing gradation conversion of picture elements that make up the image data that corresponds to each of the matrices, and sets the priority order so that the priority order becomes lower going from picture elements located in the center of the matrix toward picture elements that are located on the outside edges of the matrix; a gradation conversion means for performing gradation conversion of the picture elements according to the priority order; and an image data generation means for generating image data for printing based on a dot pattern that is formed by the picture elements after the gradation conversion.

The present invention recited in Claim 10 for solving the above-mentioned problems is directed to the image data generation processing program of claim 9, that causes a computer to function so that the gradation conversion means performs gradation conversion of the picture elements according to a gradation number of 3 or more, and performs the gradation conversion on adjacent picture elements that are adjacent to core picture elements that have that maximum gradation values among all of the picture elements after the gradation conversion so that the gradation values of the adjacent picture elements become an intermediate gradation value.

The present invention recited in Claim 11 for solving the above-mentioned problems is directed to the image data generation processing program of claim 10, that causes a computer to function so that the gradation conversion means performs the gradation conversion on adjacent picture elements that are adjacent to the adjacent picture elements so that their gradation value becomes an intermediate gradation value.

The present invention recited in Claim 12 for solving the above-mentioned problems is directed to the image data generation processing program of any one of the claims 9 to 11, that causes a computer to function so that the gradation conversion means performs a gradation value correction of the picture elements after the gradation conversion so that the gradation values become smaller.

The present invention recited in Claim 13 for solving the above-mentioned problems is directed to the image data generation processing program of claim 10 or claim 11, that causes a computer to function so that the gradation conversion means performs a gradation value correction on only the core picture elements so their gradation values become smaller.

The present invention recited in Claim 14 for solving the above-mentioned problems is directed to the image data generation processing program of claim 12 or claim 13, that causes a computer to function so that the gradation conversion means performs the gradation value correction so that the gradation values of the picture elements are equal to or greater than the critical amount of heat at which the dot pattern is stable, and equal to or less than the limit amount of heat at which transfer during printing is stable.

The present invention recited in Claim 15 for solving the above-mentioned problems is directed to a recording medium on which the image data generation processing program of any one of the claims 9 to 14 is recorded so that it can be read by a computer.

The present invention recited in Claim 16 for solving the above-mentioned problems is directed to a thermal transfer recording processing program that together with causing a computer to function based on the image data generation processing program of any one of the claims 9 to 14, further causes a computer to function as a printing means for printing the image data generated by the data image generation device on to a sheet by a thermal head.

The present invention recited in Claim 17 for solving the above-mentioned problems is directed to the thermal transfer recording processing program of claim 16 that causes a computer to function so that the printing means performs printing according to a fusion type thermal transfer method that uses fusion type thermal transfer film.

The present invention recited in Claim 1 for solving the above-mentioned problems is directed to a recording medium on which the image data generation processing program of claims 16 or 17 is recorded so that it can be read by a computer.

The present invention recited in Claim 19 for solving the above-mentioned problems is directed to an image data generation method is provided with: an image data acquisition process of acquiring image data: a division process of spatially dividing the acquired data by a plurality of matrices; a priority order setting process of setting the priority order for performing gradation conversion of picture elements that make up the image data that corresponds to each of the matrices, and sets the priority order so that the priority order becomes lower going from picture elements located in the center of the matrix toward picture elements that are located on the outside edges of the matrix; a gradation conversion process of performing gradation conversion of the picture elements according to the priority order; and an image data generation process of generating image data for printing based on a dot pattern that is formed by the picture elements after the gradation conversion.

Effects of the Invention

With this invention, input image data is spatially divided by a matrix, and gradation conversion is performed in order of priority from the picture elements located in the center of the divided matrix toward the picture elements located on the outside edge of the matrix, so gradation conversion can be performed gradually from the picture elements located in the center of the matrix, and image data can be created from a dot pattern having excellent stability and reproducibility.

BRIEF DESCRIPTION OF THE DRAWINGS

FIG. 6A is a drawing explaining the priority order matrix Mp. FIG. 6B is a drawing explaining the start-of-growth matrix Mth. FIG. 6C is a drawing explaining the input image data.

FIG. 8 is a drawing explaining the input image data and output image data.

FIG. 9(2) is a graph showing the gradation characteristics of picture elements that correspond to priority order 2.

FIG. 10(4) is a graph showing the gradation characteristics of picture elements that correspond to priority order 4.

FIG. 11 (5) is a graph showing the gradation characteristics of picture elements that correspond to priority order 5. FIG. 11(6) is a graph showing the gradation characteristics of picture elements that correspond to priority order 6.

FIG. 12(8) is a graph showing the gradation characteristics of picture elements that correspond to priority order 8.

FIG. 15 is a drawing explaining the transfer result of output image data by a thermal printer 2.

Figure 1:
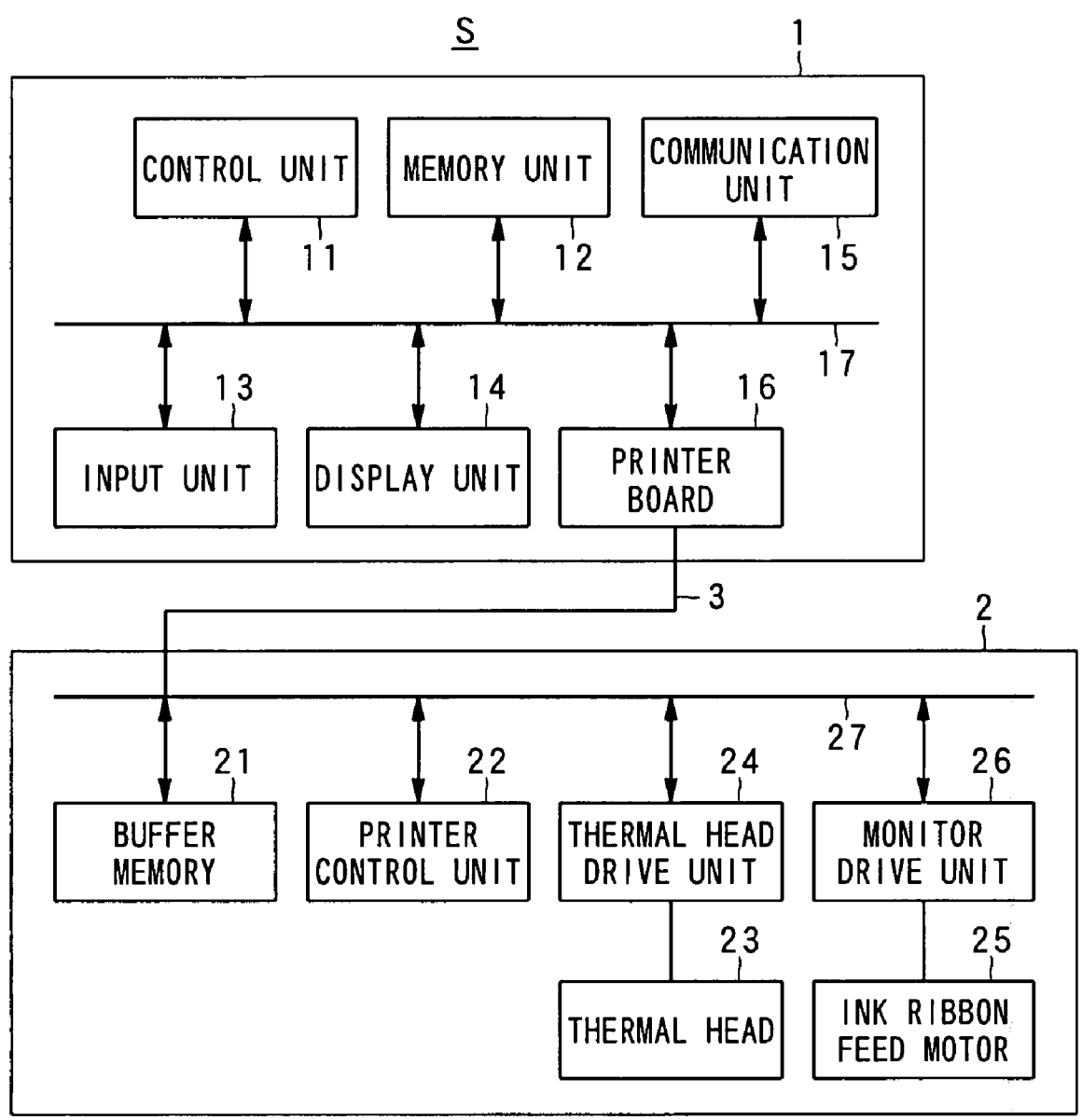
FIG. 1 is a drawing showing an example of the construction of a thermal transfer recording device of an embodiment of the invention.

DESCRIPTION OF REFERENCE NUMERALS 1 an image data creation device
2 thermal printer
11 a control unit
12 a memory unit
13 an input unit
14 a display unit
15 a communication unit
16 a printer port 16
17 a bus
21 a buffer memory
22 a printer control unit
23 a thermal head
24 a thermal head drive unit
25 an ink ribbon feed motor
26 a motor drive unit
27 a bus
S the thermal transfer recording device
f an evaluated value
n the priority order
tn the start-of-growth gradation value
Mth a start-of-growth matrix
Mp priority order matrix

BEST MODE FOR CARRYING OUT THE INVENTION

The preferred embodiment of the invention will be explained in detail with reference to the accompanying drawings.

1. Construction and Function of a Thermal Transfer Recording Device

First, the construction and function of a thermal transfer recording device of a first embodiment of the invention will be explained with reference to FIG. 1.

FIG. 1 is a drawing showing an example of the main construction of the thermal transfer recording device of this embodiment. As shown in FIG. 1, the thermal transfer recording device S comprises an image data creation device 1 and thermal printer 2.

The image-data creation device 1, for example a general-purpose computer, comprises: a control unit 11; a memory unit (for example, a hard disc, etc.) 12 that saves in memory (stores) various data, tables and programs; an input unit (for example, a keyboard, mouse, etc.) 13 that inputs instructions from a user; a display unit (for example a display) 14 that displays various data; a communication unit (for example, a communication controller, communication port, etc.) 15 for performing communication with other devices via a network; and a printer port 16 for connecting a connection cable (for example, USB cable, etc.) 3 from the thermal printer 2; where all of these components are connected together via a bus 17.

The control unit 11 comprises a CPU, RAM, ROM and the like, and by reading and executing programs (including the image data creation process program of this invention) that are stored in the memory unit 12 for example, the control unit 11 controls all of the components described above, and functions as the image data acquisition means, dividing means, image data acquisition means, priority order setting means, gradation conversion means, and image data creation means of the present invention. Each of these means will be explained in detail.

The thermal printer 2 comprises: a buffer memory 21; a printer control unit 22; a thermal head 23; a thermal head drive unit 24 that drives the thermal head 23; an ink ribbon feed motor 25; and a motor drive unit 26 that drives the ink ribbon feed motor 25; where these components are connected together via a bus 27.

Image data that is sent from the image data creation device 1 over the connection cable 3 is stored in the buffer memory 21.

The printer control unit 22 controls transfer of image data from the buffer memory 21 to the thermal head 23, and as the printing means, controls the thermal head drive unit 24 and motor drive unit 26 in order to print an image on the recording sheet. Here, in order to print an image on a recording sheet, the energy (for example 0 to 100%) that is applied to the thermal head 23 is set according to the image data and heat that corresponds to that energy is transmitted (applied) from the thermal head 23 to the thermal transfer recording material (ink ribbon), and by doing so, the ink of the portion where heat is applied melts and adheres to the recording sheet (recording (receiving) sheet such as intermediate transfer material, paper, plastic sheet, and the like). There are four kinds of ink ribbons C (Cyan), M (Magenta), Y (Yellow) and K (black), and color printing is performed by overlaying and transferring these inks.

2. Image Data Creation Process

Next, the image data creation process performed by the thermal transfer recording device S described above will be explained using the drawings. This process is performed by the image data creation device 1, and is a process of acquiring image data for printing (hereafter, referred to as 'output image data') based on input image data (hereafter, referred to as 'input image data').

Figure 2:
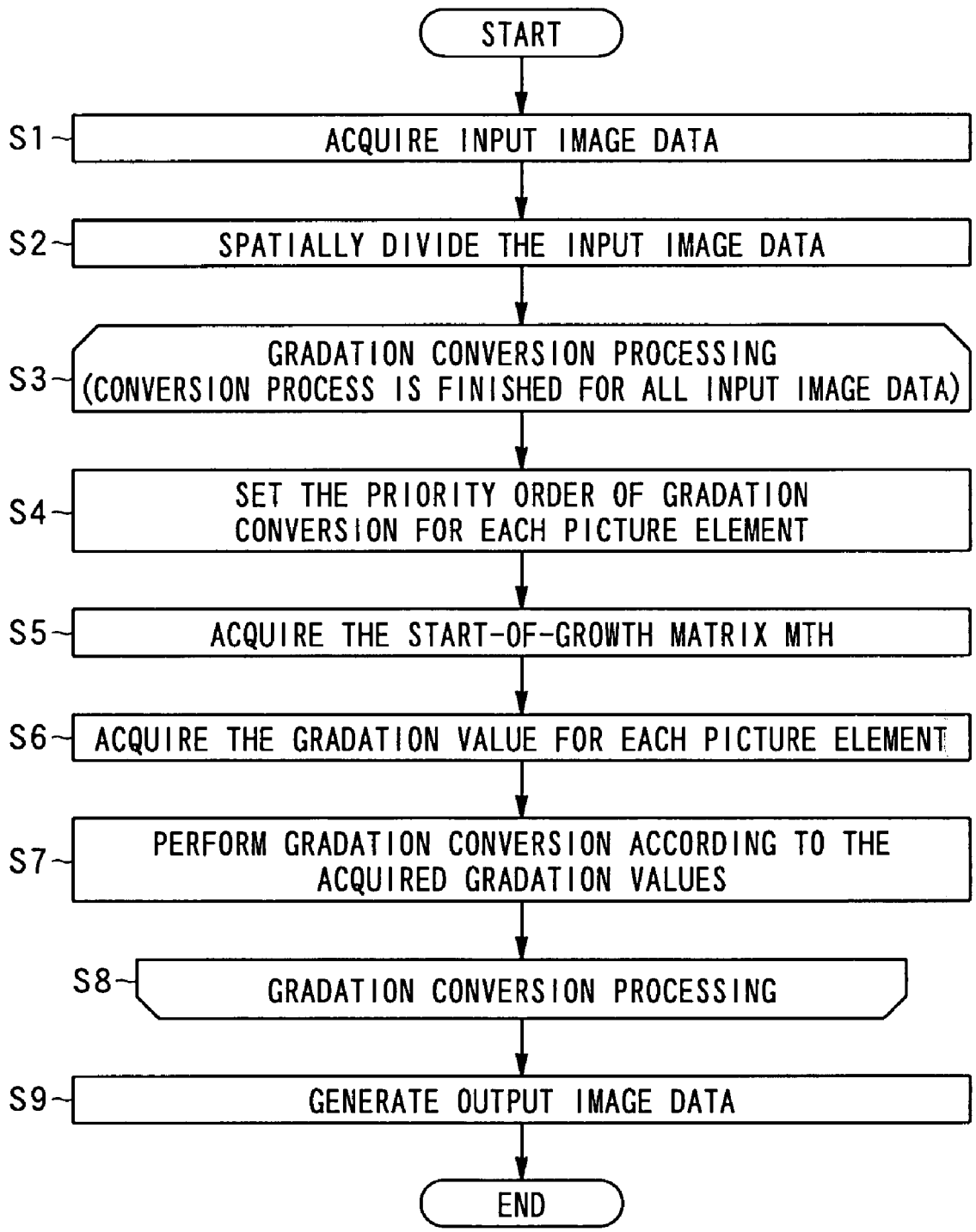
FIG. 2 is a flowchart showing the image data creation process by the control unit 11 of an image data creation device 1.

FIG. 2 is a flowchart showing the image data creation process performed by the control unit 11 of the imaged data creation device 1, and the process shown in this flowchart is executed based on control from the control unit 11 according to the image data creation process program that is stored beforehand in the ROM (not shown in the figure) of the control unit 11.

First, the control unit 11 functions as the image data acquisition means and acquires image data that is transmitted from other devices by way of the communication unit 15, or image data that is stored in the memory unit 12 as image data to be printed (step S1).

Next, the control unit 11 functions as the division means and spatially divides the acquired input image data using a plurality of matrices (step S2).

To explain this in more detail, the control unit 11 spatially divides the image data using a unit matrix (hereafter, simply referred to as a 'matrix') that comprises a plurality of picture elements that form one halftone dot. The size and shape of that matrix is determined by the thermal transfer recording device S according to the resolution and number of output lines, and particularly the shape of the matrix is determined by using a rational tangent method to perform approximation so that the tangent of each of the angles of each matrix is a rational number, in order that the aforementioned input image data can all be spatially divided by matrices having the same shape.

Figure 3:
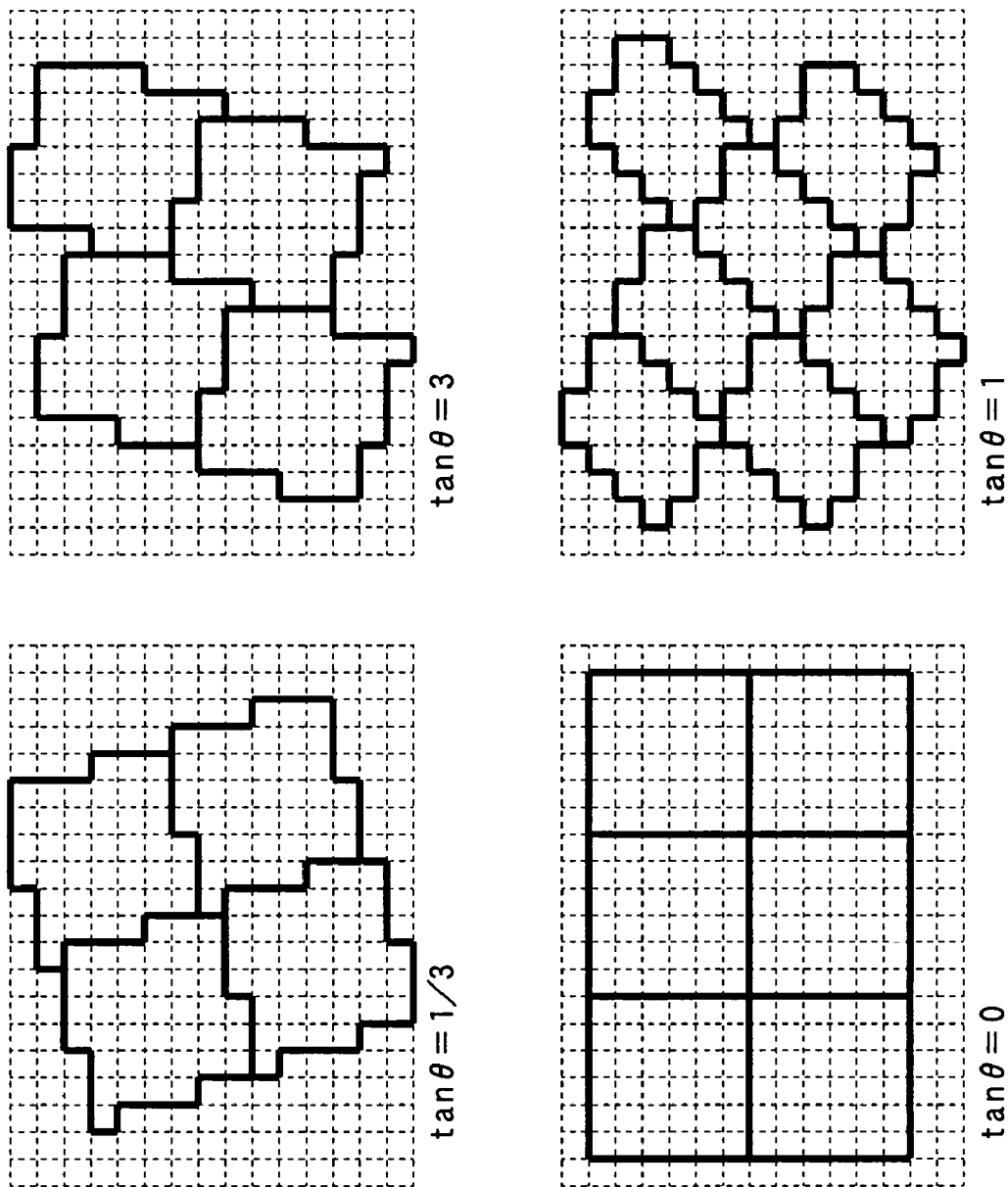
FIG. 3 is a drawing explaining an example of four types of matrices.

Also, by using four kinds of matrices that correspond to the colors C (Cyan), M (Magenta), Y (Yellow) and K (Black) and that have the tangent values '⅓', '3', '0' and '1', respectively as shown in FIG. 3, it is possible to reduce moire. In addition to this, by combining matrices of different shapes, the supercell method can be applied in which the tangent values approach '$1/3^{1/2}$' or '$3^{1/2}$'. The present invention can be applied when dividing image data using matrices having the same shape, or when dividing image data using matrices having different shapes, however, in the explanation of this embodiment, in order to simplify the explanation, a matrix having an angle of 0 degrees will be used.

Also, after the input image data has been spatially divided using a plurality of matrices as described above, the control unit moves to the gradation conversion process (step S3). The gradation conversion process is executed by each of the processes of steps S4 to S7, and is finished after gradation conversion has been performed for all of the input image data.

In the gradation conversion process, first, the control unit 11 functions as a priority order setting means and sets the order of priority for gradation conversion for each of the picture elements of the input image data that corresponds to each matrix (step S4).

Figure 4:
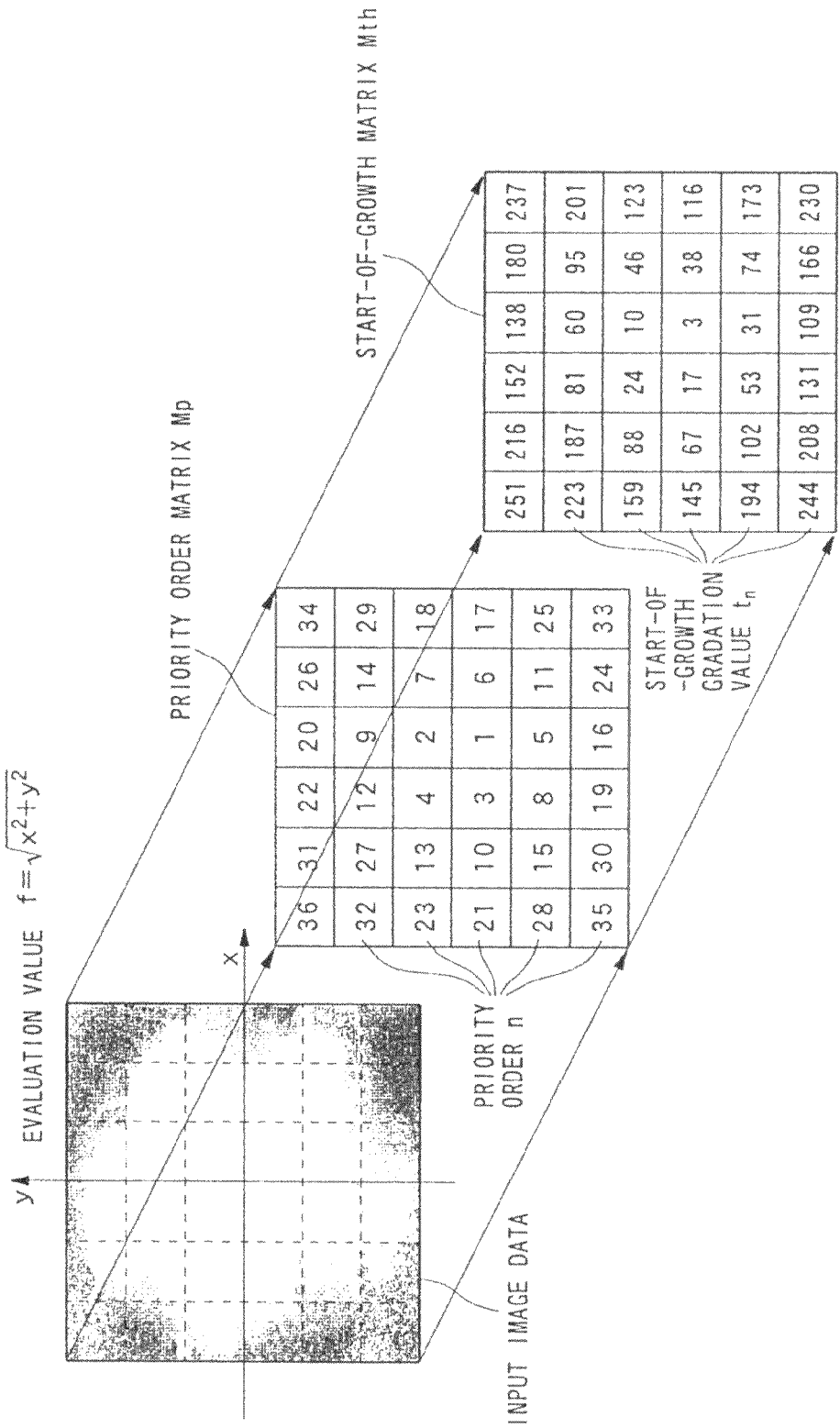
FIG. 4 is a drawing explaining a process for setting the order of priority.

This process will be explained in detail using FIG. 4. FIG. 4 is a drawing explaining the priority order setting process when growing a circular dot pattern by the gradation conversion process.

As shown in FIG. 4, an evaluated value f for each picture element is found according to the evaluation function shown in Equation 1 using the coordinates (x, y) of each of the picture elements of the input image data that correspond to an arbitrary matrix that was spatially separated in step S2.

$$f = \sqrt{x^2 + y^2}$$ [Equation 1]

The order of priority n that shows the order that dot patterns are grown is set for each picture element as 1, 2, 3 ..., in the order of smallest evaluation value f. In other words, the closer the picture elements are to the center coordinates, that is, the closer the picture elements are located to the center of the matrix the higher the order of priority is, and by comparing the priority order n with that of other picture elements, gradation conversion can be performed according to priority. In the case that there is a plurality of picture elements in the same matrix having the same evaluation value f, the order of priority n can be set according to predetermined rules such as in the order third quadrant→first quadrant→fourth quadrant→second quadrant as shown in FIG. 4, or can be set randomly.

A priority order matrix Mp that shows the order of priority n that is set for each picture element in this way can be obtained. As shown in FIG. 4, the order of priority n for each picture element is such that order of priority n becomes successively lower going from the picture element located in the center of the matrix (priority order 1) toward the picture elements location on the outside edge of the matrix.

Also, returning to the flowchart, the control unit 11 finds the start-of-growth gradation value tn for each picture element, and acquires a start-of-growth matrix Mth (step S5). For example, the start-of-growth gradation value tn for each picture element in the 6 (picture elements)×6 (picture elements) priority order matrix Mp shown in FIG. 4 can be found from Equation 2 below. In the equation, 'n' indicates the order of priority.

$$tn = \frac{(255 \cdot n)}{36} - \frac{255}{72}$$ [Equation 2]

Based on the start-of-growth matrix Mth that is acquired in this way, the control unit 11 acquires output gradation values for each picture element (step S6). Next, the control unit 11 functions as the gradation conversion means and performs gradation conversion for each of the picture elements according to the gradation values acquired in step S6 (step S7). Also, after the gradation conversion process is finished for all of the input image data (step S8), the control unit 11 functions as the image data creation means and creates output image data for printing based on the dot pattern that was formed by each of the picture elements after gradation conversion (step S9), and then ends processing. The output image data that is created in this way is such that it can be printed (printing means) on a recording sheet by the thermal head 23 according to an instruction that is input by the user from the input unit 13, for example.

2.1 Output Gradation Values

Next, the process of acquiring output gradation values (step S6) and performing gradation conversion (step S7) in the flowchart described above will be explained in detail using the drawings.

Figure 5:
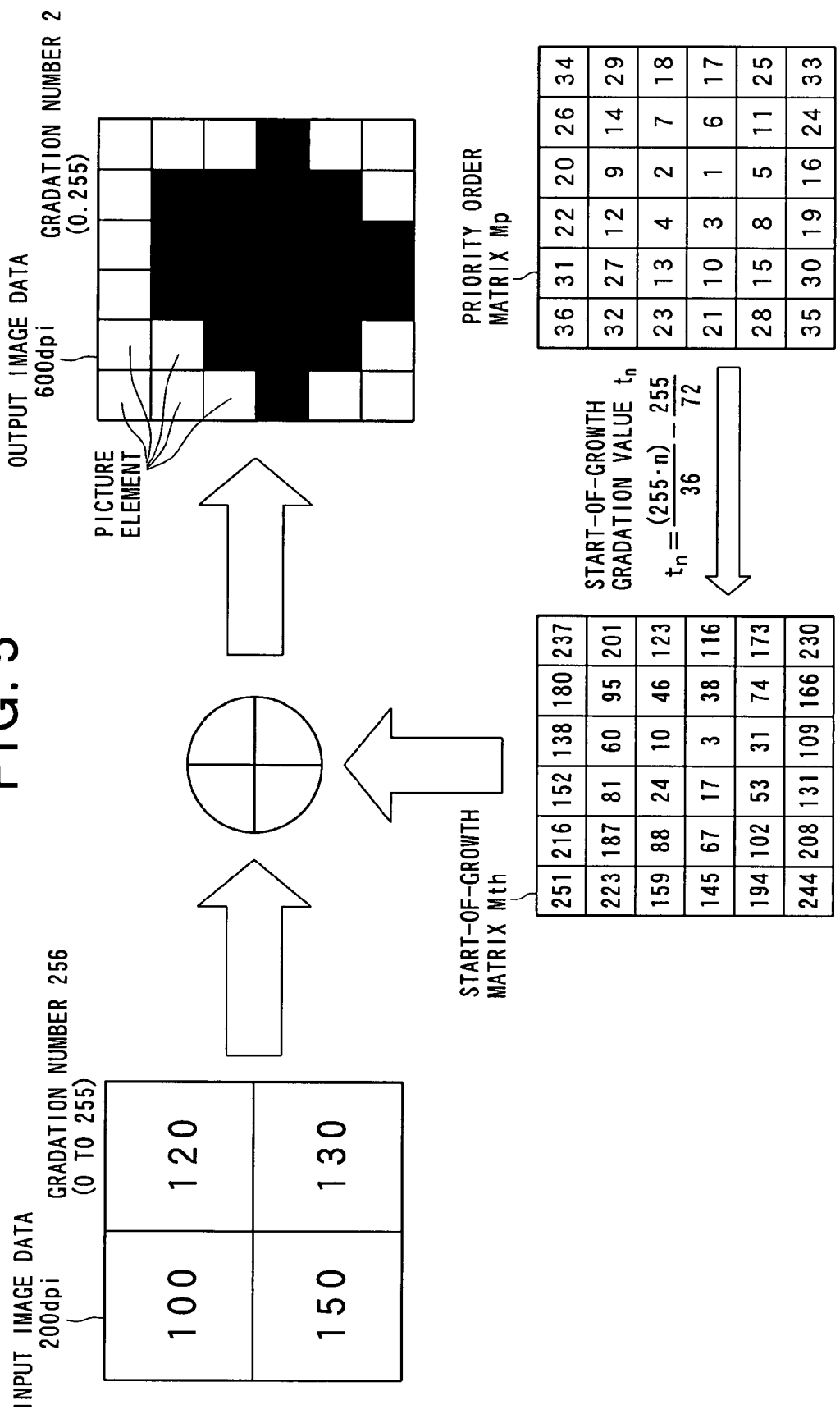
FIG. 5 is a drawing explaining the acquisition of output gradation values for a gradation number of 2.

FIG. 5 is a drawing explaining the process when acquiring output gradation values for 600 dpi and gradation number 2 based on the start-of-growth matrix Mth for each picture element of the image data, which is 200 dpi (dots per inch) and gradation number 256 (from 0 to 255).

In this embodiment, the gradation conversion that is performed on each of the picture elements of the input image data is performed according to the start-of-growth matrix Mth for each of the matrices that were spatially divided in step S2 described above. Here, gradation conversion for the case of acquiring output gradation values '0' or '255' (gradation number 2) shown in FIG. 5 will be explained for a matrix having picture elements having any of the input gradation values '100', '120', '150' and '130' before conversion.

When the gradation values of each of the picture elements of the input image data (hereafter, referred to as the 'input gradation values') are equal to or greater than the start-of-growth gradation value tn that corresponds to the picture elements in the start-of-growth matrix Mth, '255' is acquired as the output gradation value (black in the output data shown in FIG. 5), and when the input gradation values are less than the start-of-growth gradation value tn that corresponds to the picture elements in the start-of-growth matrix Mth, '0' is acquired as the output gradation value (white in the output data shown in FIG. 5).

In other words, in the example shown in FIG. 5, when explaining each of the picture elements whose input gradation value is '100' (corresponds to the upper left of the input image data in FIG. 5), the output gradation values for the picture elements that are located where the start-of-growth gradation values tn that correspond to the start-of-growth matrix Mth are '24', '81' and '88' are acquired as '255', and the output gradation values for the other picture elements are acquired as '0'.

Similarly, when explaining each of the picture elements whose input gradation value is '120' (corresponds to the upper right of the input image data in FIG. 5), the output gradation values for the picture elements that are located where the start-of-growth gradation values tn that correspond to the start-of-growth matrix Mth are '10', '46', '60' and '95' are acquired as '255', and the output gradation values for the other picture elements are acquired as '0'.

Similarly, when explaining each of the picture elements whose input gradation value is '150' (corresponds to the lower left of the input image data in FIG. 5), the output gradation values for the picture elements that are located where the start-of-growth gradation values tn that correspond to the start-of-growth matrix Mth are '53', '102' and '131' are acquired as '255', and the output gradation values for the other picture elements are acquired as '0'.

Similarly, when explaining each of the picture elements whose input gradation value is '120' (corresponds to the lower right of the input image data in FIG. 5), the output gradation values for the picture elements that are located where the start-of-growth gradation values tn that correspond to the start-of-growth matrix Mth are '3', '31', '38', '74', '109' and '116' are acquired as '255', and the output gradation values for the other picture elements are acquired as '0'.

In this way, the start-of-growth gradation values tn that correspond to the start-of-growth matrix Mth for each of the picture elements are used as so-cal led threshold values, and by comparing the start-of-growth gradation values tn with the input gradation values, the output gradation values for each of the picture elements of the output image data are acquired. In this way, by performing settings so that the start-of-growth gradation values become larger according to the priority order that is set in order from the center of the spatially divided matrix toward the outer edge of the matrix, gradation conversion is performed from the center toward the outer edge, and thus a dot pattern can be grown while maintaining stability. Therefore, it is possible for a thermal printer 2 to print the generated output image data stably and with high quality.

2.2 Output Gradation Number

Next, in order to simplify the explanation, the 3 (picture elements)×3 (picture elements) priority order matrix Mp shown in FIG. 6A, and the 3 (picture elements)×3 (picture elements) start-of-growth matrix Mth shown in FIG. 6B will be used to explain the case of finding gradation values for each picture element of the input image data shown in FIG. 6C.

All of the picture elements in the input image data shown in FIG. 6C have a gradation value (input gradation value) of '99', so when that input gradation value '99' is equal to or greater than the start-of-growth gradation value tn that corresponds to each of the picture elements of the start-of-growth matrix Mth that is shown in FIG. 6B, the output gradation values for the picture elements are acquired as being '255', and when less than the start-of-growth gradation value tn that corresponds to the picture elements, the output gradation values of those picture elements are acquired as being '0'.

Figure 7A:
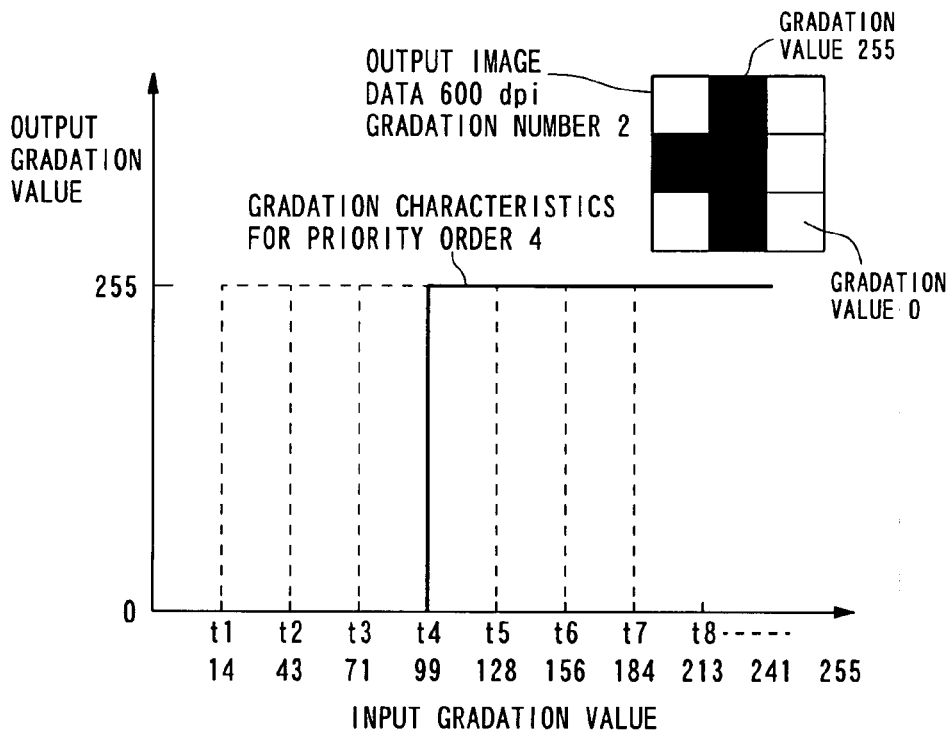
FIG. 7A is a drawing explaining the output image data of the gradation number 2 and the gradation characteristics of priority order 4.

FIG. 7A shows the output image data for a gradation number of 2, and the gradation characteristics for priority order 4. FIG. 7A also is a graph that shows the gradation characteristics of the picture elements that correspond to priority order 4 in the priority order matrix Mp shown in FIG. 6A.

It can be seen that the start-of-growth gradation value t4 for the elements that correspond to priority order 4 in the priority order matrix Mp (see FIG. 6A) have a value '99' according to the start-of-growth matrix Mth shown in FIG. 6B. In other words, the picture elements that correspond to priority order 4 have gradation characteristics so that when the input gradation value become 99 or greater, the output gradation value changes from '0' to '255'.

As described above, by setting the start-of-growth gradation values tn according to the priority order n that is set in order from the center of the spatially divided matrix toward the outside edge, a dot pattern can be grown gradually from the center toward the outside edge.

An embodiment in which output gradation values were acquired for a gradation number of 2 was explained above, however, next an embodiment will be explained in detail for the case in which the gradation number of the output image data is increased, and multiple output gradation values are acquired (gradation number of 3 or more).

Figure 7B:
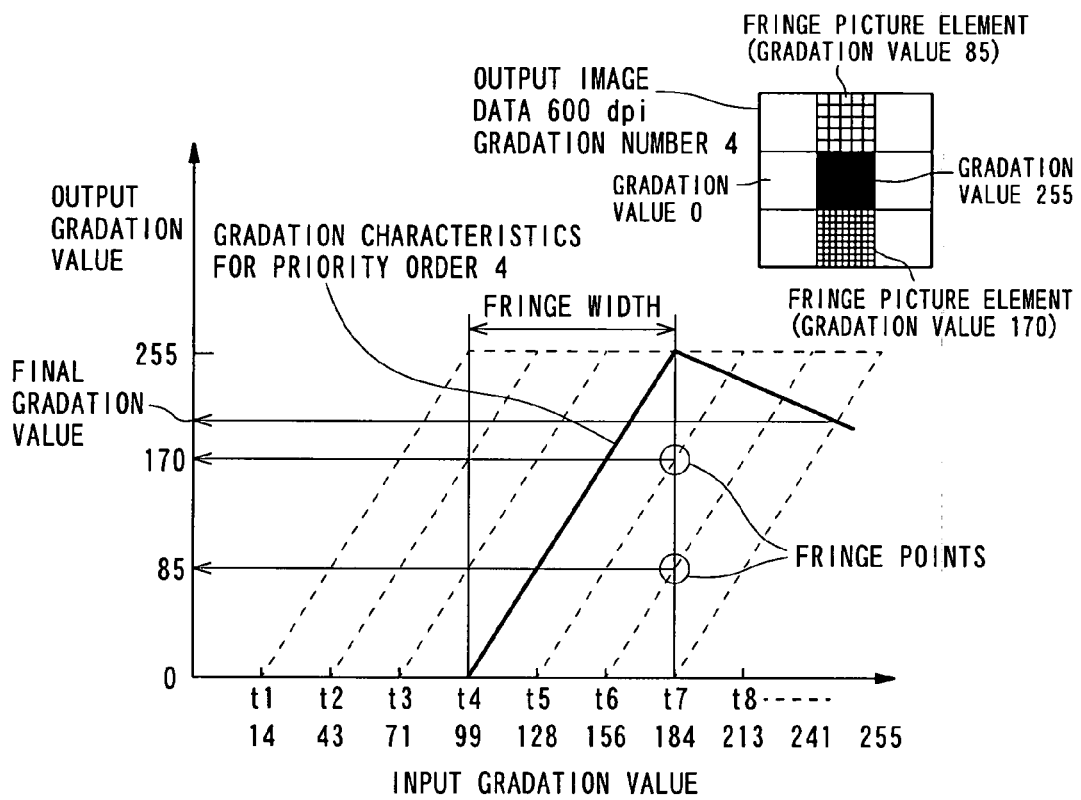
FIG. 7B is a drawing explaining the output image data of gradation number 4 and the gradation characteristics of priority order 4.

FIG. 7B is a graph similar to the graph in FIG. 7A and shows the gradation characteristics of picture elements that correspond to priority order 4 in the priority order matrix Mp shown in FIG. 6A, and shows the output image data for a gradation number of 4 (0, 85, 170, 255) and the gradation characteristics of the picture elements that correspond to priority order 4. As shown in FIG. 7B, for the picture elements that correspond to priority order 4, an output gradation value of '0' is acquired for input gradation values from '0' to '99', after that a uniform increase continues up to an input gradation value of '184' and at an input gradation value of '184' an output gradation value of '255' is reached. All of the picture elements of the input image data shown in FIG. 6C have a gradation value (input gradation value) of '99', so in the output image data, the gradation value for locations that correspond to priority order 4 becomes '0'.

Figure 12:
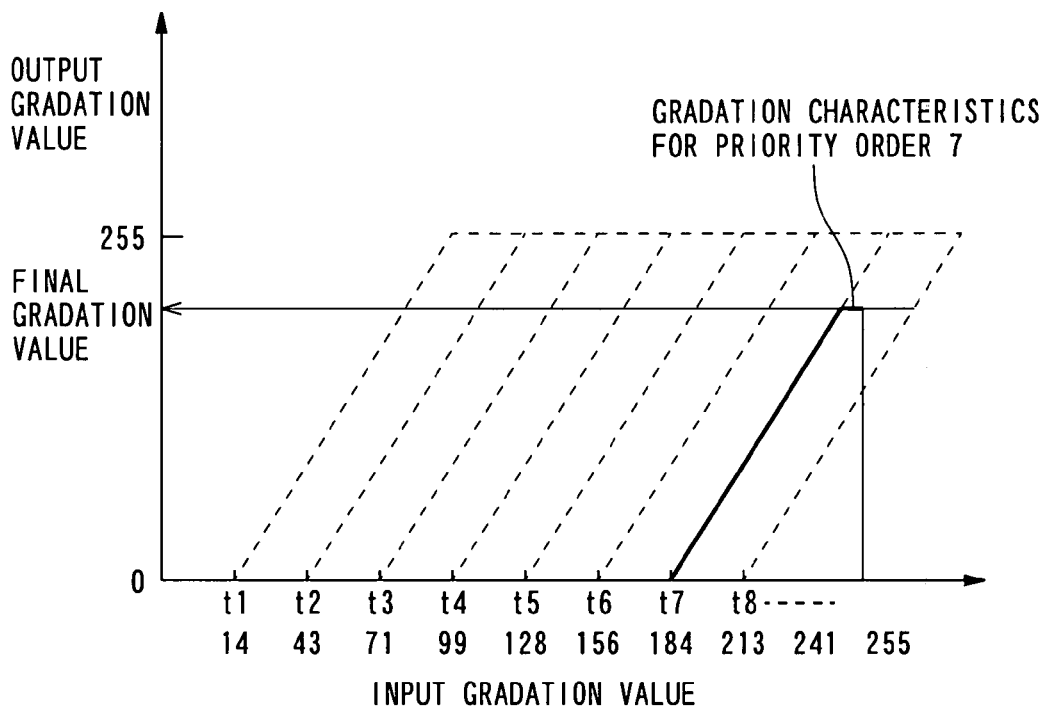
FIG. 12 (7) is a graph showing the gradation characteristics of picture elements that correspond to priority order 7.
Figure 12:
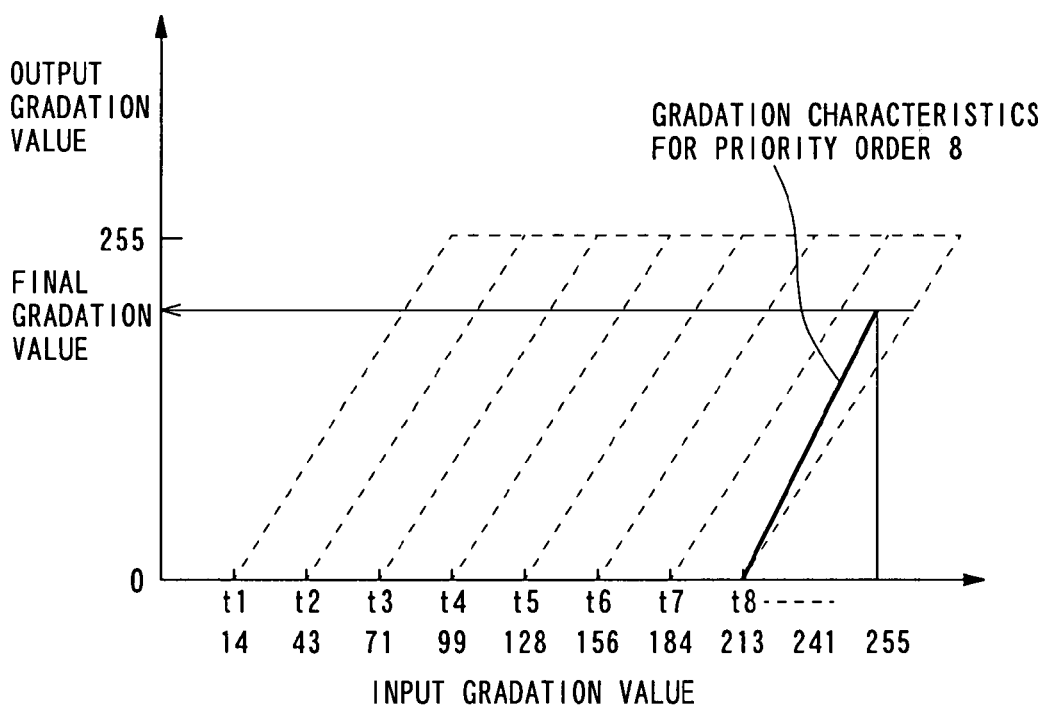
Figure 13:
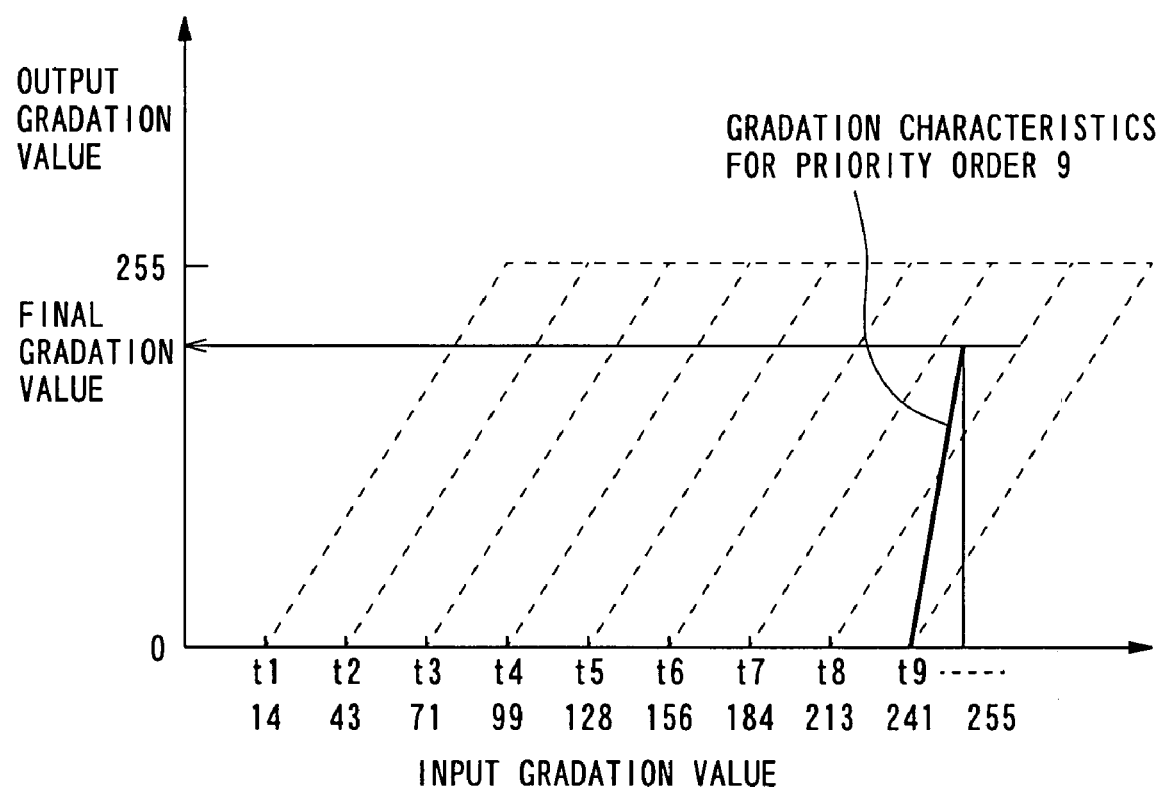
FIG. 13 (9) is a graph showing the gradation characteristics of picture elements that correspond to priority order 9.

FIG. 8 is a drawing explaining output image data that is created by acquiring: gradation values using input image data having picture elements having input gradation values of '43', '71', '99', '128', '156', '184', '213' and '241', the priority order matrix Mp shown in FIG. 6A for each of the picture elements for the input image data, and the start-of-growth matrix Mth shown in FIG. 6B, and performing gradation conversion. Also, FIG. 9 (1) is a graph showing the gradation characteristics of picture elements that correspond to priority order 1, FIG. 9(2) is a graph showing the gradation characteristics of picture elements that correspond to priority order 2, FIG. 10 (3) is a graph showing the gradation characteristics of picture elements that correspond to priority order 3, FIG. 10(4) is a graph showing the gradation characteristics of picture elements that correspond to priority order 4, FIG. 11 (5) is a graph showing the gradation characteristics of picture elements that correspond to priority order 5, FIG. 11(6) is a graph showing the gradation characteristics of picture elements that correspond to priority order 6, FIG. 12 (7) is a graph showing the gradation characteristics of picture elements that correspond to priority order 7, FIG. 12(8) is a graph showing the gradation characteristics of picture elements that correspond to priority order 8, and FIG. 13 (9) is a graph showing the gradation characteristics of picture elements that correspond to priority order 9.

Figure 9:
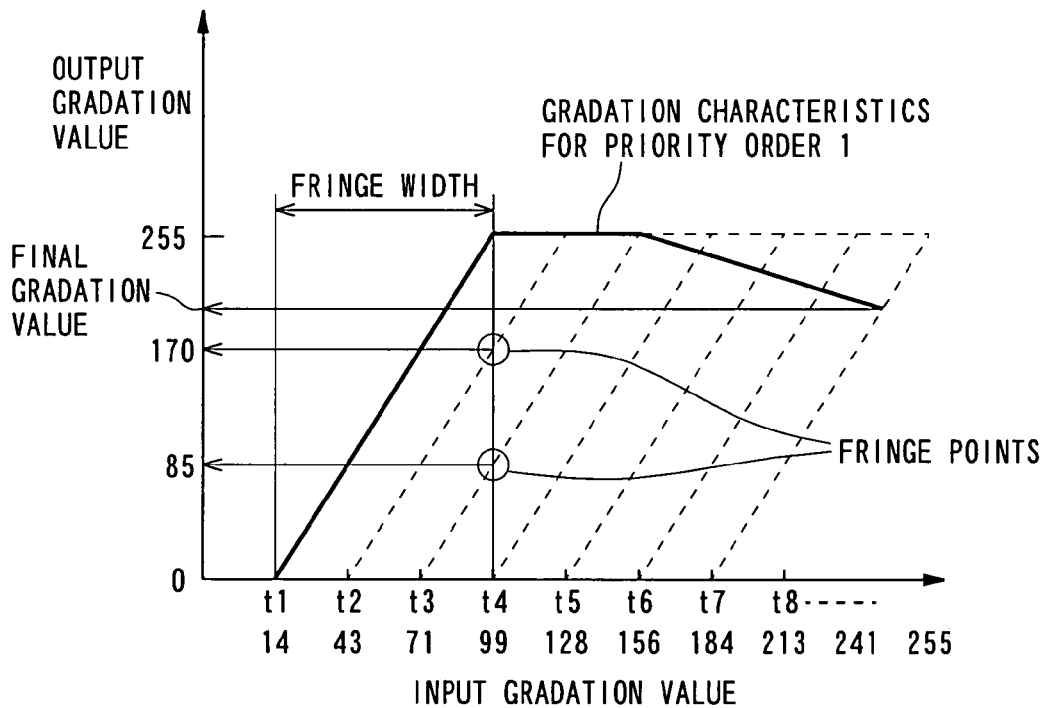
FIG. 9 (1) is a graph showing the gradation characteristics of picture elements that correspond to priority order 1.
Figure 9:
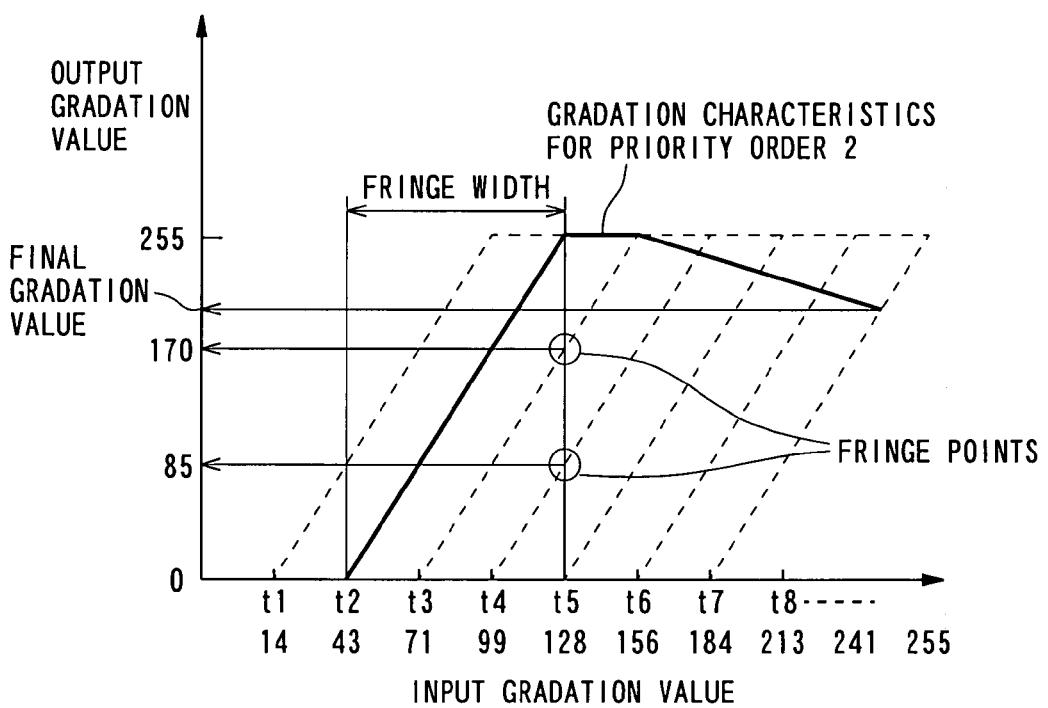

To explain this using the drawings, in the case where the input gradation value is '43', referring to the gradation characteristics of the picture elements that correspond to each priority order shown in FIG. 9 to FIG. 13, an input graduation value of '43' is located inside the fringe width for the gradation characteristics for picture elements that correspond to priority order 1 (see FIG. 9(1)). Therefore, the picture elements that correspond to priority order 1 acquire an intermediate gradation value of '85' as the output gradation value. When the input gradation value is '43', the picture elements that correspond to priority order 1 acquire an intermediate gradation value in this way, however, as shown in FIG. 8, those picture elements are not adjacent to the picture elements of the picture elements corresponding to each priority order having the highest gradation value (core picture elements), so those picture elements are not the adjacent picture elements of this invention, but are simply picture elements in the process of growing.

Also, in the case where the input gradation value is '71', when referring to the gradation characteristics of the picture elements that correspond to each priority order in FIG. 9 to FIG. 13, an input graduation value of '71' is located inside the fringe width for the gradation characteristics for picture elements that correspond to priority order 1, and for the gradation characteristics for picture elements that correspond to priority order 2 (see FIG. 9(1) and FIG. 9(2)). Therefore the picture elements that correspond to priority order 1 have an intermediate gradation value of '170' as the output gradation value, and picture elements that correspond to priority order 2 have an intermediate gradation value of '85' as the output gradation value. Also, since the picture elements corresponding to priority order 1 have the largest gradation value, they become the core picture elements. Moreover, the picture elements that correspond to priority order 2 are adjacent to the picture elements that correspond to priority order 1 as the core picture elements, so these picture elements that correspond to priority order 2 correspond to fringe picture elements (adjacent picture elements).

Also, in the case where the input gradation value is '99', when referring to the gradation characteristics of the picture elements that correspond to each priority order in FIG. 9 to FIG. 13, an input graduation value of '99' has an output gradation value of '255' for gradation characteristics of picture elements that correspond to priority order 1, and the picture elements that correspond to priority order 1 become the core picture elements (see FIG. 9(1)). Furthermore, an input graduation value of '99'; is located inside the fringe width for gradation characteristics of picture elements that correspond to priority order 2 and for gradation characteristics of picture elements that correspond to priority order 3 (see FIG. 9(2) and FIG. 10(3)). Therefore the picture elements that correspond to priority order 2 have an intermediate gradation value of '170' as an output gradation value, and picture elements that correspond to priority order 3 have an intermediate gradation value of '85' as an output gradation value, and as shown in FIG. 8, these picture elements that correspond to priority order 2 and priority order 3 are adjacent to the core picture elements (picture elements that correspond to priority order 1), so these picture elements that correspond to priority order 2 and priority order 3 correspond to fringe picture elements (adjacent picture elements).

In this way, construction is such that the fringe picture elements that are adjacent to the core picture elements having intermediate gradation values, or in other words, the fringe elements are grown after the core elements, so it is possible to gradually increase the gradation value in the direction that the dot pattern grows, and thus it is possible to stably grow the dot pattern.

Continuing the explanation, when the input gradation value is '128', then referencing the gradation characteristics for picture elements that correspond to each of the priority orders in FIG. 9 to FIG. 13, for gradation characteristics of picture elements that correspond to priority order 1 and priority order 2, the output gradation value becomes '255', and the picture elements that correspond to the priority order 1 and priority order 2 become the core picture elements (see FIG. 9(1) and FIG. 9(2)). Also, for gradation characteristics of picture elements that correspond to priority order 3 and gradation characteristics of picture elements that correspond to priority order 4, the input gradation value of '128' is located in the fringe width (see FIG. 10(3) and FIG. 10(4)). Therefore, the picture elements that corresponds to priority order 3 have an intermediate gradation value of '170', and the picture elements that correspond to priority order 4 having an intermediate value of '85', and as shown in FIG. 8, these picture elements that correspond to priority order 3 and priority order 4 are adjacent to the core picture elements (picture elements that correspond to priority order 1), so these picture elements that correspond to priority order 3 and priority order 4 correspond to fringe picture elements.

Figure 10:
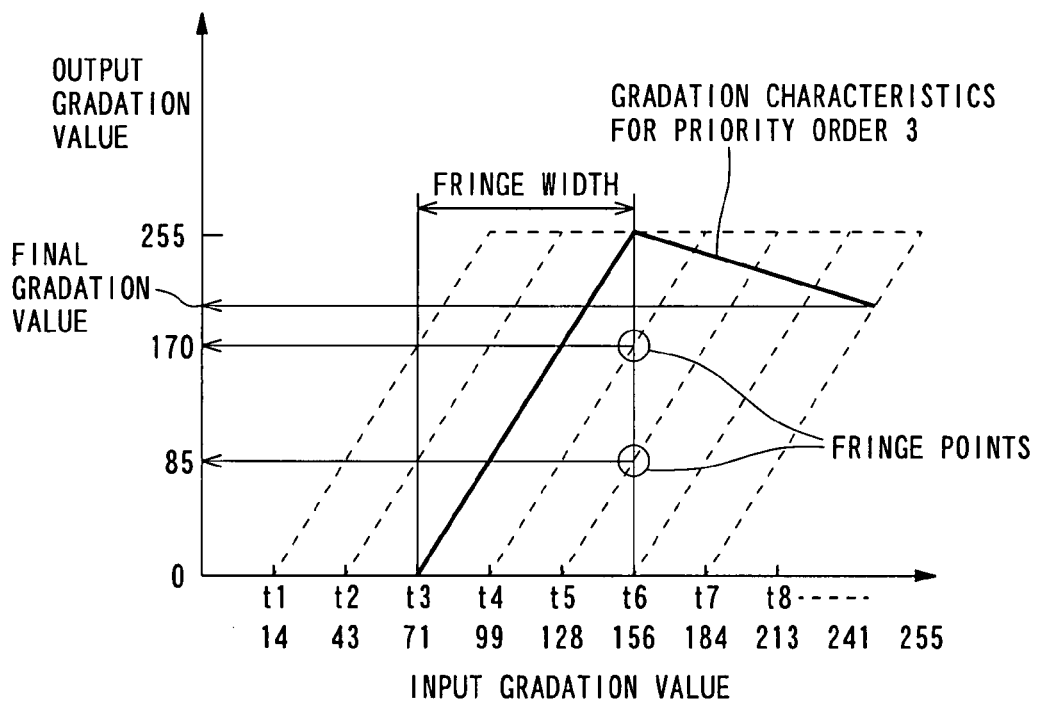
FIG. 10 (3) is a graph showing the gradation characteristics of picture elements that correspond to priority order 3.
Figure 10:
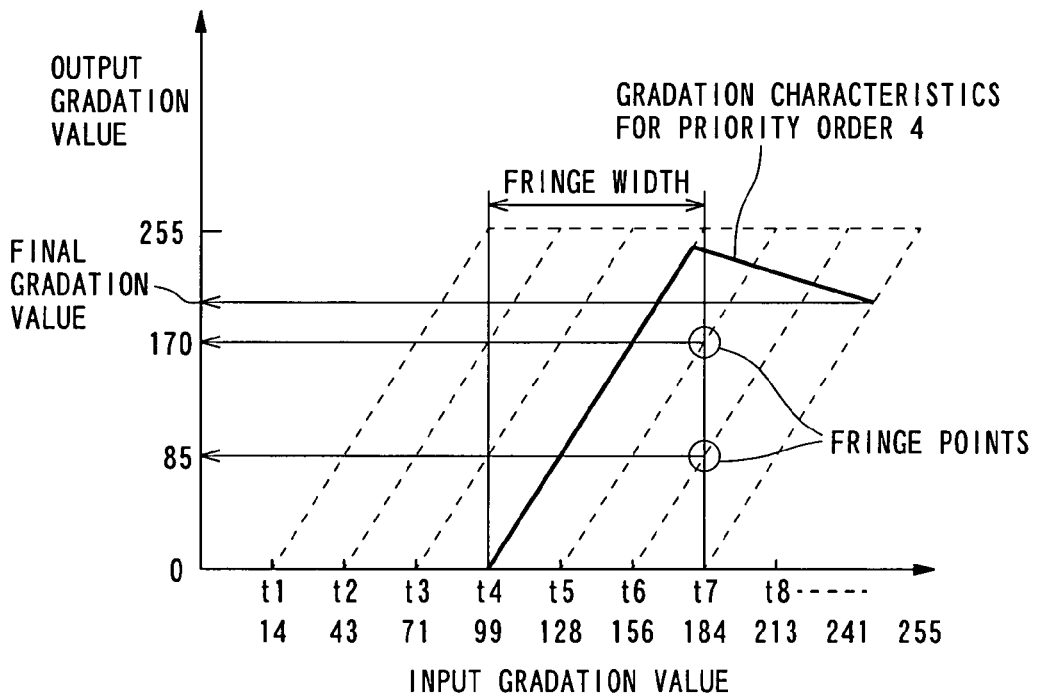

Similarly, when the input gradation value is '156', the output gradation value of the picture elements that correspond to priority order 1 to priority order 3 become the maximum gradation value of '255', and these picture elements that correspond to priority order 1 to priority order 3 come the core picture elements (see FIG. 9(1), FIG. 9(2) and FIG. 10(3)). Also, the picture elements that correspond to priority order 4 and priority order 5 have intermediate values of '170' and '85', respectively, and correspond to fringe picture elements.

Then, when the input gradation value is '184', the output gradation value of the picture elements that correspond to priority order 1 to priority order 4 become the maximum gradation value, and these picture elements that correspond to priority order 1 to priority order 4 come the core picture elements (see FIG. 9(1), FIG. 9(2), FIG. 10(3) FIG and 10(4)). Also, the picture elements that correspond to priority order 5 and priority order 6 adjacent to these core picture elements have intermediate values of '170' and '85', respectively, and correspond to fringe picture elements.

As shown in FIG. 9(1), FIG. 9(2) and FIG. 10(3), the output gradation values of picture elements that correspond to priority order 1 to priority order 4 are corrected (gradation value correction) so that they become smaller. In other words, similarly, as shown in the figure, even for gradation characteristics of picture elements that correspond to each of the priority orders when the input gradation values are '213' and '241' (see FIG. 9 to FIG. 13), when an input gradation value becomes greater than a specified value, gradation value correction is performed so that the gradation value becomes smaller.

Figures 14A, 14B:
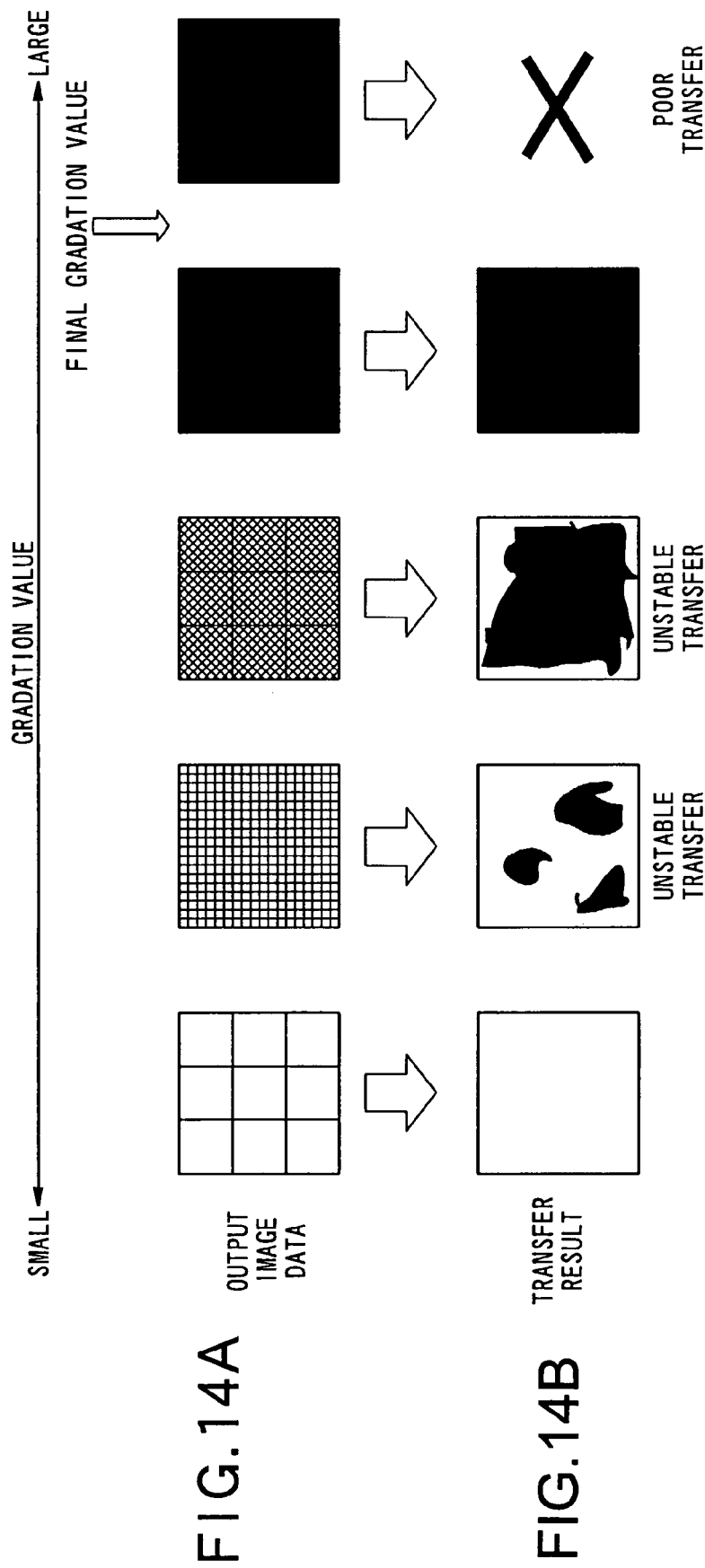
FIG. 14A is a drawing explaining output image data picture elements having various gradation values.
FIG. 14B is a drawing explaining the transfer result of output image data by a thermal printer 2.

As shown in FIG. 9 to FIG. 13, when performing gradation value correction, it is preferred that the gradation value after correction is equal to or greater than the final gradation value. It is preferred that this final gradation value is equal to or greater than the critical amount of heat at which the dot pattern formed by the picture elements is stable, and equal to or less than the limit amount of heat at which transfer is stable when performing printing by the thermal printer 2. More specifically, when printing an image, the thermal head 23 of the thermal printer applies heat to the heat transfer recording material (ink ribbon or the like) according to the gradation values that correspond to the picture elements, and by doing so, the ink of the portion where heat is applied melts and adheres to the recording sheet. Therefore, when the gradation value is less than the critical amount of heat for the ink to adhere stably, the gradation characteristics are lowered. However when the input gradation value is relatively large, and larger than the limit amount of heat, sticking or wrinkling of the image due to excessive accumulated heat occurs (instable transfer occurs). The final gradation value that is equal to or greater than the critical amount of heat and equal to or less than the limit amount of heat depends on the various characteristics of the thermal transfer recording material (ink ribbon or the like), recording sheet, voltage applied to the thermal head, etc., so, for example, is set beforehand by experiment or the like as shown in FIG. 14. FIG. 14A shows output image data, and FIG. 14B shows the transfer effect of the output image data by the thermal printer 2. As shown in the figure, output image data having various gradation values are prepared in advance, and that output image data is printed by the thermal printer 2 and the final gradation value is obtained in advance from the transfer effect to the recording sheet (see FIG. 14(B)). The gradation value of the output image data shown in the figure is gradually increased from left to right, and it is preferred that the gradation value that corresponds to the location indicated by the arrow in the figure be taken to be the final gradation value.

By performing correction of the picture elements in this way so that the gradation values become small, it is possible to prevent the occurrence of sticking or wrinkling of the image due to excessive accumulated heat and to perform printing at higher quality when printing the generated output image data on the recording sheet by the thermal printer 2 even when the input gradation value is relatively large. In this embodiment, as shown in FIG. 9 to FIG. 13, correction is performed for the picture elements that correspond to each priority order so that the gradation values become small, however, it is possible to perform gradation correction on just the core picture elements.

The output image data that is generated from the input image data shown in FIG. 8 is transferred to the recording sheet by the thermal printer 2, and the result is shown in FIG. 15. As shown in FIG. 15, even though the input gradation value is large, by gradually growing the dot pattern from the center, it was possible to improve reproducibility by the thermal transfer recording device S.

Figure 16:
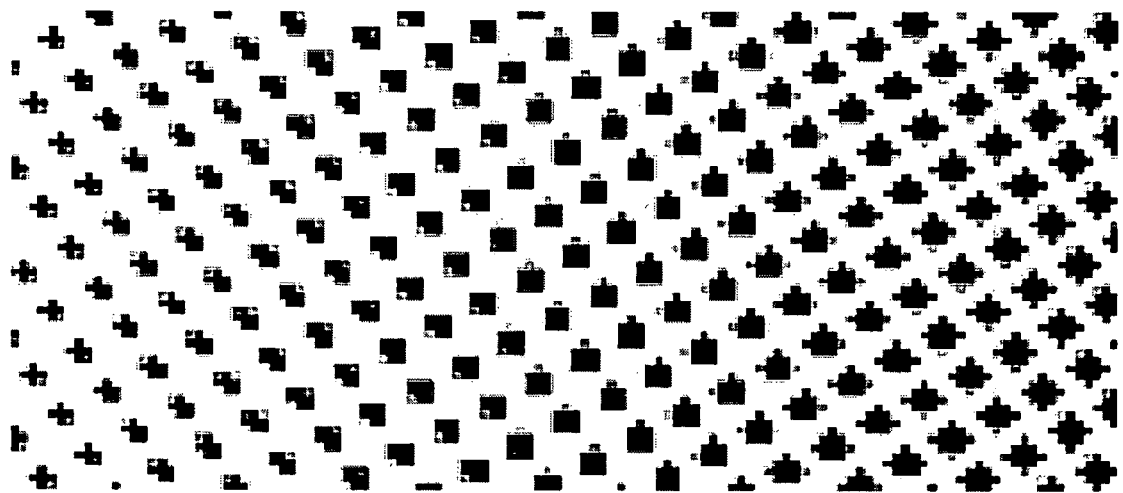
FIG. 16 shows an example of a dot patter for each gradation when the fringe width is 2.
Figure 17:
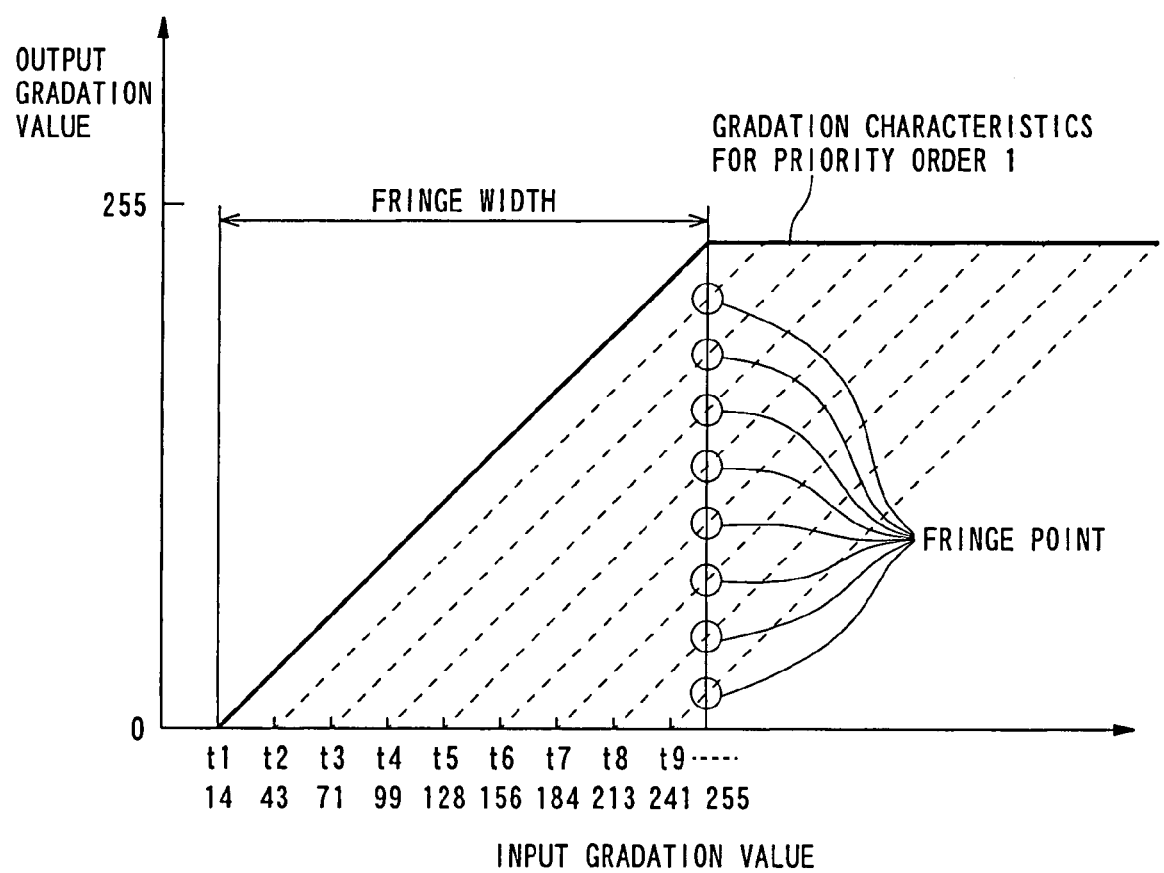
FIG. 17 is a graph showing the gradation characteristics of picture elements that correspond to priority order 1 when the fringe width is 8.
Figure 18:
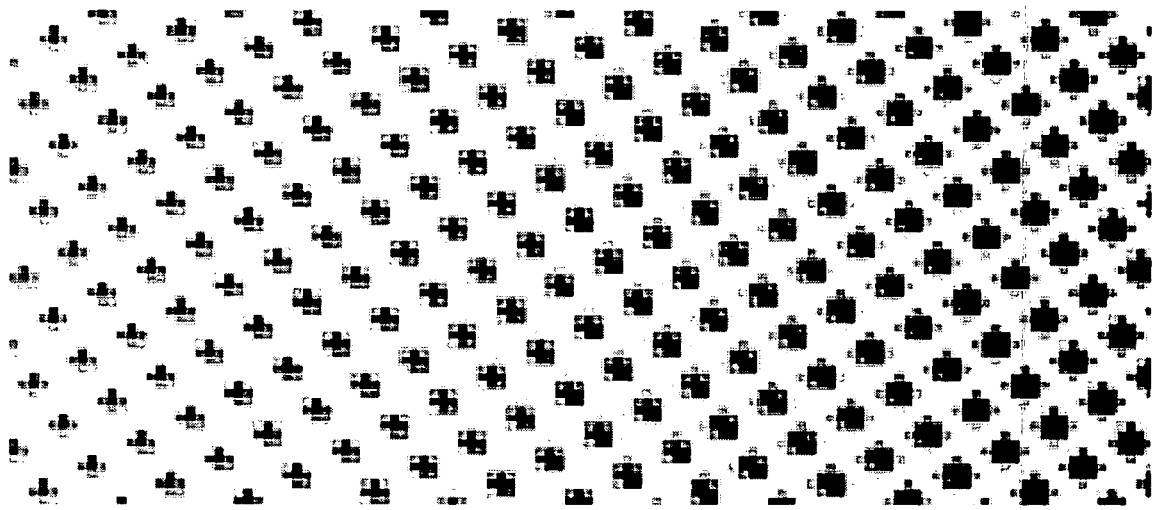
FIG. 18 shows an example of a dot pattern for each gradation when the fringe width is 8.

In the example described, the fringe width is taken to be '2', and is such that up to two fringe picture elements exist in the dot pattern. FIG. 16 shows an example of a dot pattern for each gradation when the fringe width is 2. The invention is not limited to a fringe width of '2', and can be freely adjusted. For example, FIG. 17 shows a graph of the gradation characteristics of picture elements that correspond to priority order 1 when the fringe width is '8'. In this example, the picture elements that are adjacent to the core picture elements are the fringe picture elements, however, in the case shown in FIG. 17, picture elements that are not adjacent to the core picture elements but that are adjacent to the fringe picture elements are taken to be fringe elements. It is possible to freely widen or narrow the width of the so-called fringe section according to the fringe picture elements that have intermediate gradation values and that are placed around the core picture elements by adjusting the fringe width. FIG. 18 shows an example of a dot pattern for all gradations when the fringe width is '8'.

Figure 19:
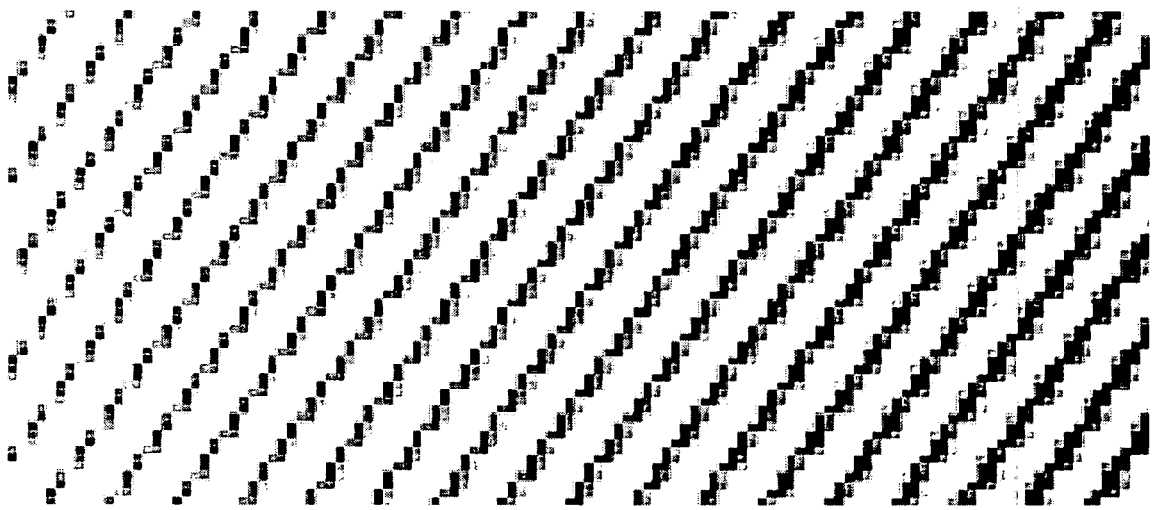
FIG. 19 shows an example of a 10000-line dot pattern.

In this embodiment, the case of growing a circular dot pattern by setting an evaluation value f using Equation 1 as described above was explained, however, the dot pattern is not limited to this and can be any shape as long as it is a cluster-type dot pattern. For example, a 10000-line dot pattern as shown in FIG. 19 is possible. In the case of a horizontal 10000-line dot pattern, the evaluation value f for each picture element is found using the evaluation function given in Equation 3, and in the case of a vertical 10000-line dot pattern, the evaluation value f for each picture element is found using the evaluation function given in Equation 4.

$$f=|y|$$ [Equation 3]

$$f=|x|$$ [Equation 4]

In addition to this, an elliptical dot pattern, square dot pattern, rectangular dot pattern or polygonal dot pattern could be used, and in that case as well, by using an evaluation function in which the evaluation value f becomes higher the closer the picture elements are to the center of the matrix as described above, a priority order n can be set so that priority becomes lower in order going from the picture elements located in the center of the matrix toward the picture elements located on the outside edges of the matrix.

As explained above, with the thermal transfer recording device S of this embodiment, the image data creation device 1 is constructed so that input image data is spatially divided by a matrix, and gradation conversion is performed based on a start-of-growth gradation value that is set according to a priority order that is set in order from the picture elements located in the center of the divided matrix toward the picture elements that are located on the outside edges of the matrix, so as the input gradation value of the input image data becomes larger, it is possible to gradually perform gradation conversion from the picture elements that are located in the center of the matrix. Therefore, a dot pattern having good reproducibility can be grown stably regardless of the size of the input gradation value of the input image data, and it is possible for the thermal printer 2 to perform high-quality printing with a high level of gradation.

Figure 20:
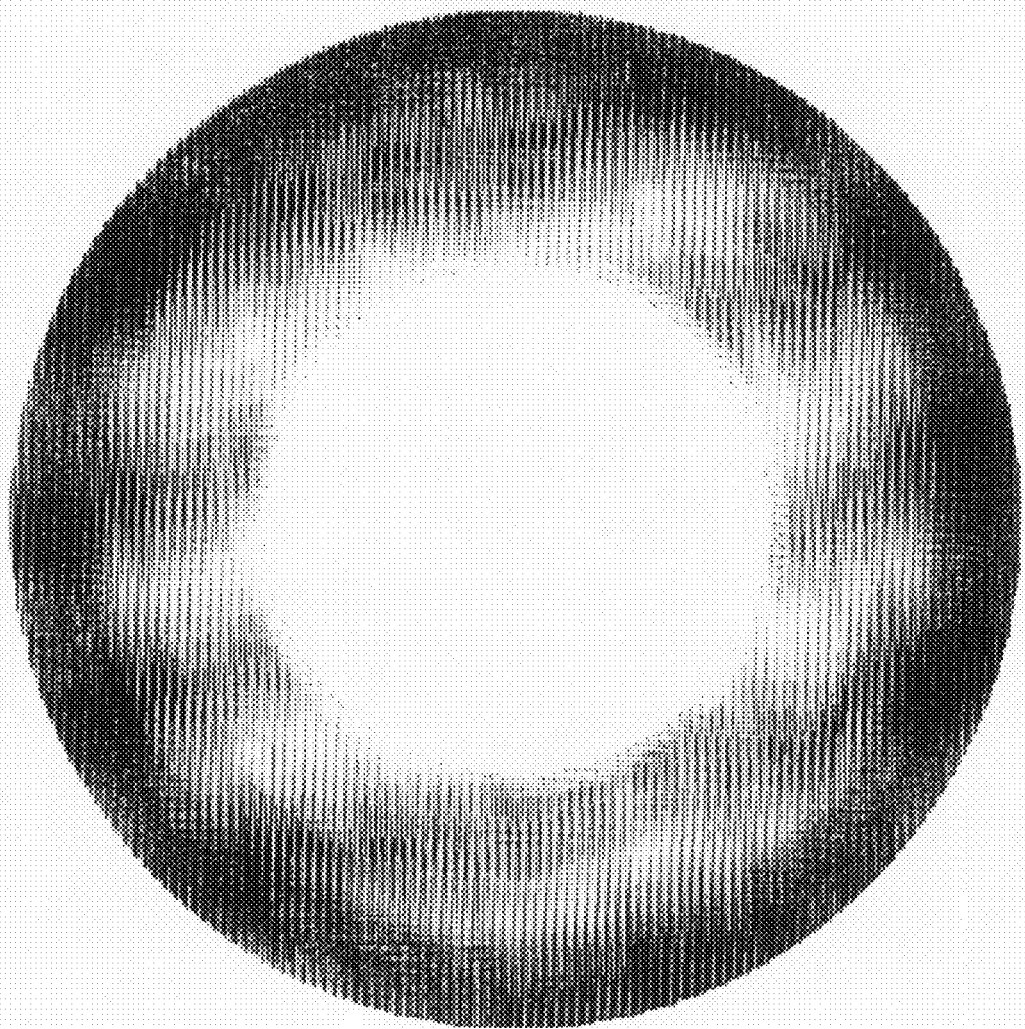
FIG. 20 shows an example of transfer by a prior thermal transfer recording method.
Figure 21:
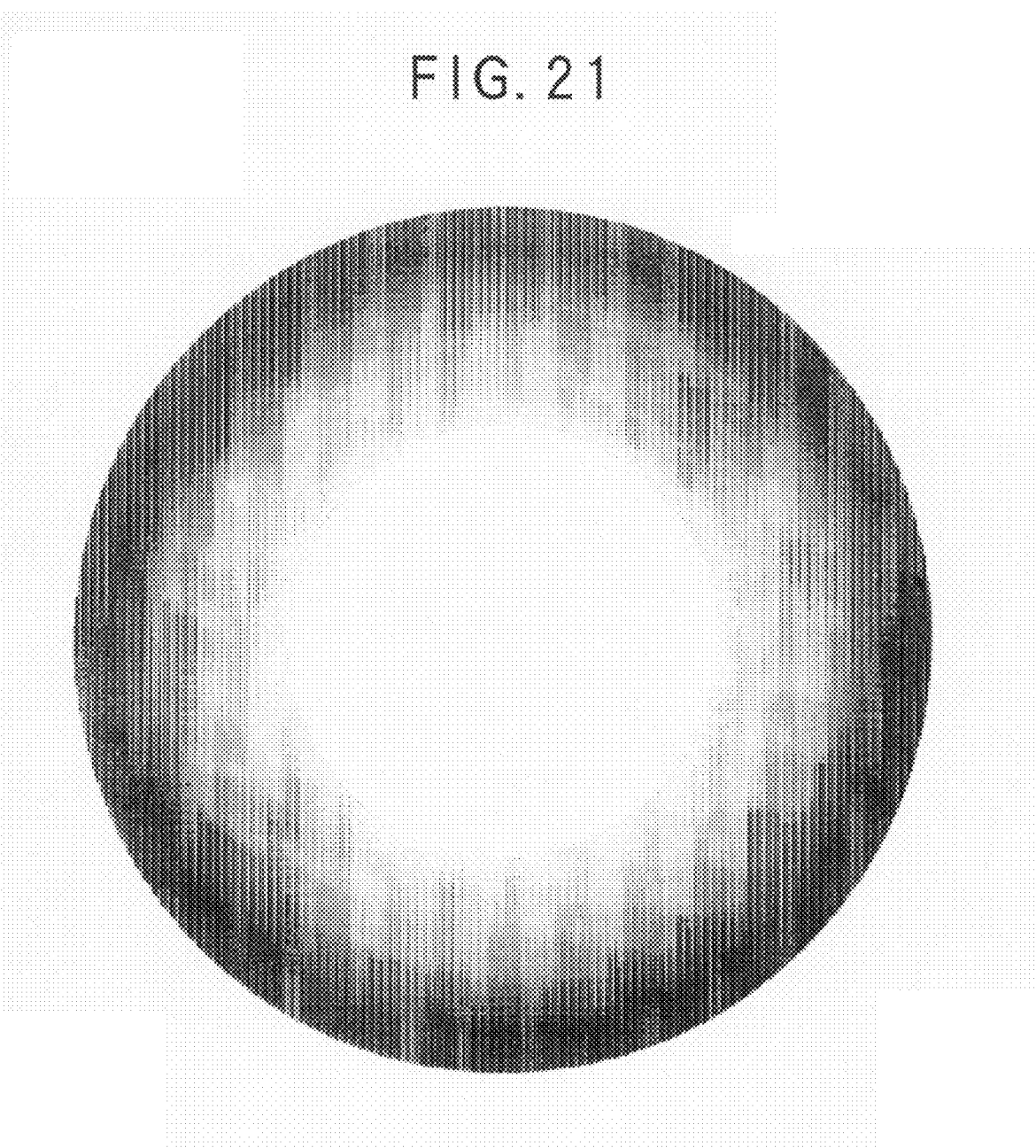
FIG. 21 shows an example of transfer by a thermal transfer recording device S of an embodiment of the invention.

FIG. 20 shows an example of transfer by a prior thermal transfer recording method, and FIG. 21 shows an example of transfer by the thermal transfer recording device S of this embodiment. As can be clearly seen by comparing the two figures, with the thermal transfer recording device S of this embodiment, it is possible to perform printing having high-level gradation and in which so-called tone jump is improved.

What is claimed is:

1. An image data generation device, comprising:
   an image data acquisition means for acquiring image data;
   a division means for spatially dividing the acquired data by a plurality of matrices;
   a priority order setting means for setting the priority order for performing gradation conversion of picture elements that make up the image data that corresponds to each of the matrices, and sets the priority order so that the priority order becomes lower going from picture elements located in the center of the matrix toward picture elements that are located on the outside edges of the matrix;
   a gradation conversion means for performing gradation conversion of the picture elements according to the priority order; and
   an image data generation means for generating image data for printing based on a dot pattern that is formed by the picture elements after the gradation conversion,
   wherein,
   the gradation conversion means performs gradation conversion of the picture elements according to a gradation number of 3 or more, and performs the gradation conversion on adjacent picture elements that are adjacent to core picture elements that have that maximum gradation values among all of the picture elements after the gradation conversion so that the gradation values of the adjacent picture elements become an intermediate gradation value, and the number of adjacent picture elements is determined as a fringe width, and the fringe width can be freely adjusted, and high priority order adjacent picture elements out of the fringe width become the maximum gradation value as core picture elements.

2. The image data generation device of claim 1, wherein the gradation conversion means performs the gradation conversion on adjacent picture elements that are adjacent to the adjacent picture elements so that their gradation value becomes an intermediate gradation value.

3. The image data generation device of claim 1, wherein the gradation conversion means performs a gradation value correction of the picture elements after the gradation conversion so that the gradation values become smaller.

4. The image data generation device of claim 3, wherein the gradation conversion means performs the gradation value correction so that the gradation values of the picture elements are equal to or greater than the critical amount of heat at which the dot pattern is stable, and equal to or less than the limit amount of heat at which transfer during printing is stable.

5. The image data generation device of claim 1, wherein the gradation conversion means performs a gradation value correction on only the core picture elements so that their gradation values become smaller.

6. A thermal transfer recording means comprising:
the image data generation device of claim 1; and
a printing means for printing the image data generated by the data image generation device on to a sheet by a thermal head.

7. A thermal transfer recording device comprising:
the image data generation device of claim 1,
wherein the printing means performs printing according to a fusion type thermal transfer method that uses fusion type thermal transfer film.

8. A non-transitory computer readable recording medium with an image data generation processing program stored thereon that makes a computer function as:
an image data acquisition means for acquiring image data;
a division means for spatially dividing the acquired data by a plurality of matrices;
a priority order setting means for setting the priority order for performing gradation conversion of picture elements that make up the image data that corresponds to each of the matrices, and sets the priority order so that the priority order becomes lower going from picture elements located in the center of the matrix toward picture elements that are located on the outside edges of the matrix;
a gradation conversion means for performing gradation conversion of the picture elements according to the priority order; and
an image data generation means for generating image data for printing based on a dot pattern that is formed by the picture elements after the gradation conversion,
wherein,
the gradation conversion process performs gradation conversion of the picture elements according to a gradation number of 3 or more, and performs the gradation conversion on adjacent picture elements that are adjacent to core picture elements that have that maximum gradation values among all of the picture elements after the gradation conversion so that the gradation values of the adjacent picture elements become an intermediate gradation value, and the number of adjacent picture elements is determined as a fringe width, and the fringe width can be freely adjusted, and high priority order adjacent picture elements out of the fringe width become the maximum gradation value as core picture elements.

9. The non-transitory computer readable recording medium of claim 8, that causes a computer to function so that the gradation conversion means performs gradation conversion of the picture elements according to a gradation number of 3 or more, and performs the gradation conversion on adjacent picture elements that are adjacent to core picture elements that have that maximum gradation values among all of the picture elements after the gradation conversion so that the gradation values of the adjacent picture elements become an intermediate gradation value.

10. The non-transitory computer readable recording medium of claim 9, that causes a computer to function so that the gradation conversion means performs the gradation conversion on adjacent picture elements that are adjacent to the adjacent picture elements so that their gradation value becomes an intermediate gradation value.

11. The non-transitory computer readable recording medium of claim 9, that causes a computer to function so that the gradation conversion means performs a gradation value correction on only the core picture elements so their gradation values become smaller.

12. The non-transitory computer readable recording medium of claim 8, that causes a computer to function so that the gradation conversion means performs a gradation value correction of the picture elements after the gradation conversion so that the gradation values become smaller.

13. The non-transitory computer readable recording medium of claim 12, that causes a computer to function so that the gradation conversion means performs the gradation value correction so that the gradation values of the picture elements are equal to or greater than the critical amount of heat at which the dot pattern is stable, and equal to or less than the limit amount of heat at which transfer during printing is stable.

14. The non-transitory computer readable recording medium of claim 8, further causes a computer to function as a printing means for printing the image data generated by the data image generation device on to a sheet by a thermal head.

15. The non-transitory computer readable recording medium of claim 14, wherein
the printing means performs printing according to a fusion type thermal transfer method that uses fusion type thermal transfer film.

16. An image data generation method comprising:
an image data acquisition process of acquiring image data;
a division process of spatially dividing the acquired data by a plurality of matrices;
a priority order setting process of setting the priority order for performing gradation conversion of picture elements that make up the image data that corresponds to each of the matrices, and sets the priority order so that the priority order becomes lower going from picture elements located in the center of the matrix toward picture elements that are located on the outside edges of the matrix;
a gradation conversion process of performing gradation conversion of the picture elements according to the priority order; and an image data generation process of generating image data for printing based on a dot pattern that is formed by the picture elements after the gradation conversion,
wherein,
the gradation conversion process performs gradation conversion of the picture elements according to a gradation number of 3 or more, and performs the gradation conversion on adjacent picture elements that are adjacent to core picture elements that have that maximum gradation values among all of the picture elements after the gradation conversion so that the gradation values of the adjacent picture elements become an intermediate gradation value, and
the number of adjacent picture elements is determined as a fringe width, and the fringe width can be freely adjusted, and high priority order adjacent picture elements out of the fringe width become the maximum gradation value as core picture elements.

* * * * *